(12) United States Patent
Urata et al.

(10) Patent No.: US 7,463,820 B2
(45) Date of Patent: Dec. 9, 2008

(54) DATA REPRODUCING APPARATUS AND DATA REPRODUCING METHOD

(75) Inventors: Kaoru Urata, Kanagawa (JP); Mamoru Mizukami, Tokyo (JP); Masanari Yoshida, Kanagawa (JP)

(73) Assignee: Sony Corporation (JP)

( * ) Notice: Subject to any disclaimer, the term of this patent is extended or adjusted under 35 U.S.C. 154(b) by 942 days.

(21) Appl. No.: 11/028,337

(22) Filed: Jan. 4, 2005

(65) Prior Publication Data

US 2005/0196133 A1 Sep. 8, 2005

(30) Foreign Application Priority Data

Jan. 9, 2004 (JP) ............... 2004-004506

(51) Int. Cl.
H04N 7/26 (2006.01)
H04N 5/91 (2006.01)
H03M 13/00 (2006.01)
G11B 5/09 (2006.01)

(52) U.S. Cl. .................. 386/124; 386/81; 714/758; 360/39

(58) Field of Classification Search ............ 386/81, 386/124; 360/39; 714/758
See application file for complete search history.

(56) References Cited

U.S. PATENT DOCUMENTS 5,940,574 A 8/1999 Iwamoto et al.

6,069,995 A 5/2000 Sugiyama et al.
6,158,039 A * 12/2000 Cho et al. ............... 714/769

FOREIGN PATENT DOCUMENTS

JP 09-266563 10/1997
JP 09-312090 12/1997

OTHER PUBLICATIONS

EPO Search Report dated May 3, 2005.

* cited by examiner

Primary Examiner—Thai Tran
Assistant Examiner—Asher Khan
(74) Attorney, Agent, or Firm—Rader Fishman & Grauer PLLC; Ronald P. Kananen

(57) ABSTRACT

The present invention relates to a non-tracking VTR apparatus. The data reproducing apparatus is characterized in that, of tracks of the predetermined number serving as the editing unit, tracks of a part of the rear side are set to a pre-writing priority area and the remaining tracks are set to a post-writing priority area, with respect to each recording block reproduced from the pre-writing priority area and which is error-corrected by C1 error correction, it is determined whether or not the reproduced data of the recording block with the same ID as that of the recording block is written in the memory. The reproduced data of the recording block in which the reproduced data was not written is written in the memory and the reproduced data of the recording block in which the reproduced data was written is inhibited from being written in the memory.

6 Claims, 18 Drawing Sheets

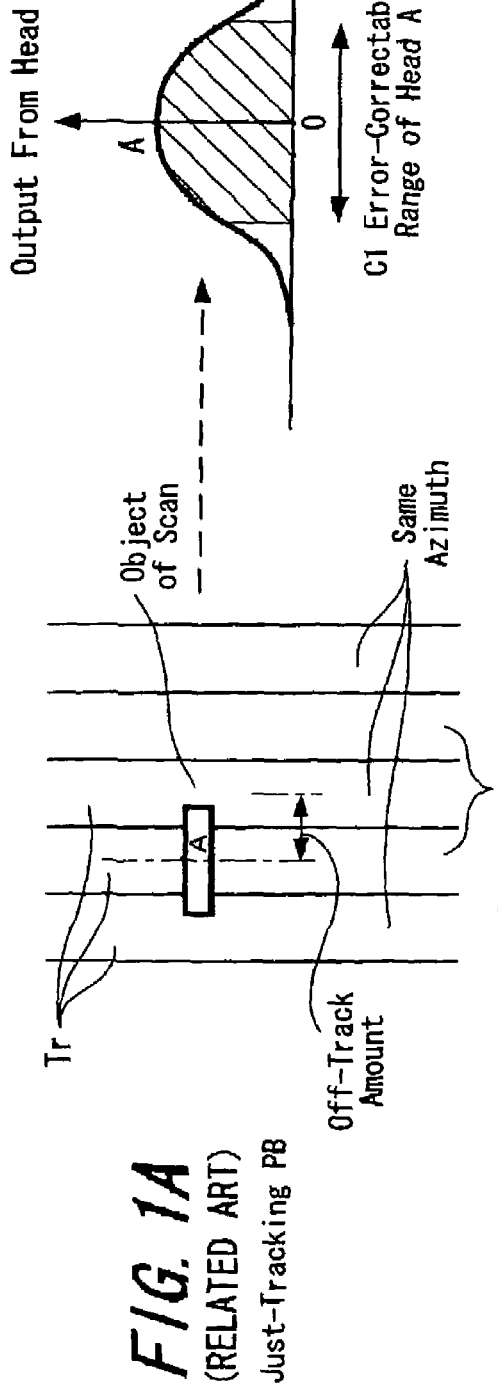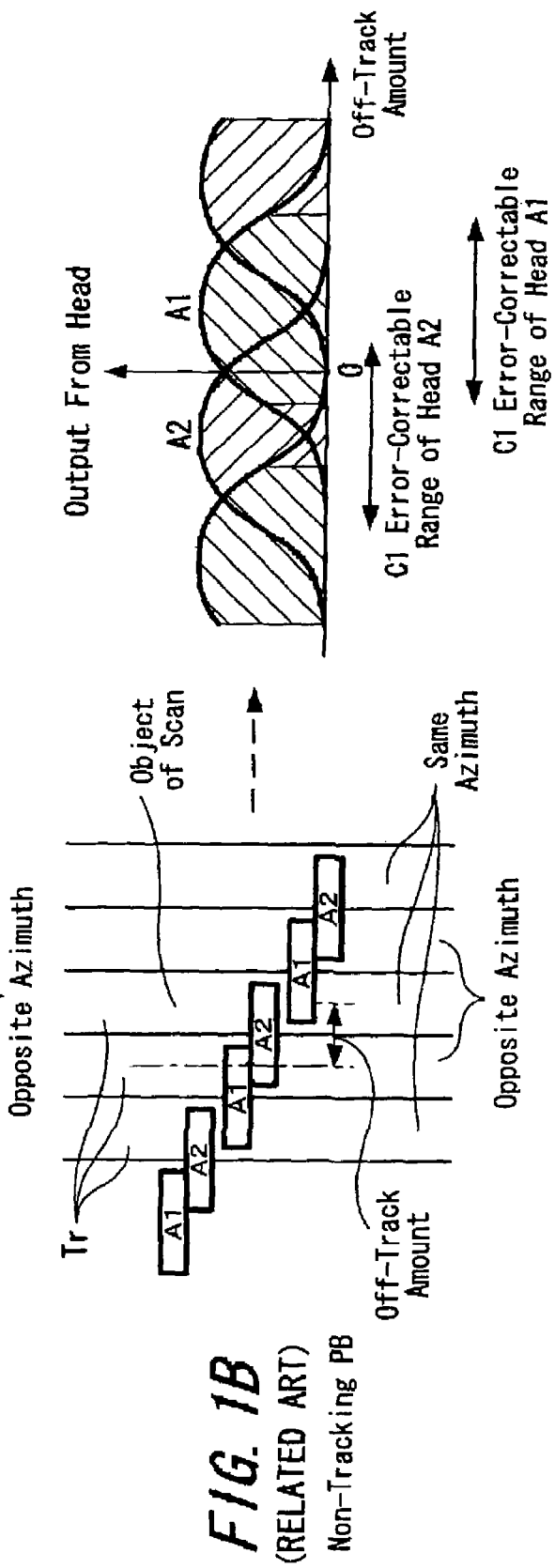
FIG. 1A (RELATED ART) Just-Tracking PB
FIG. 1B (RELATED ART) Non-Tracking PB

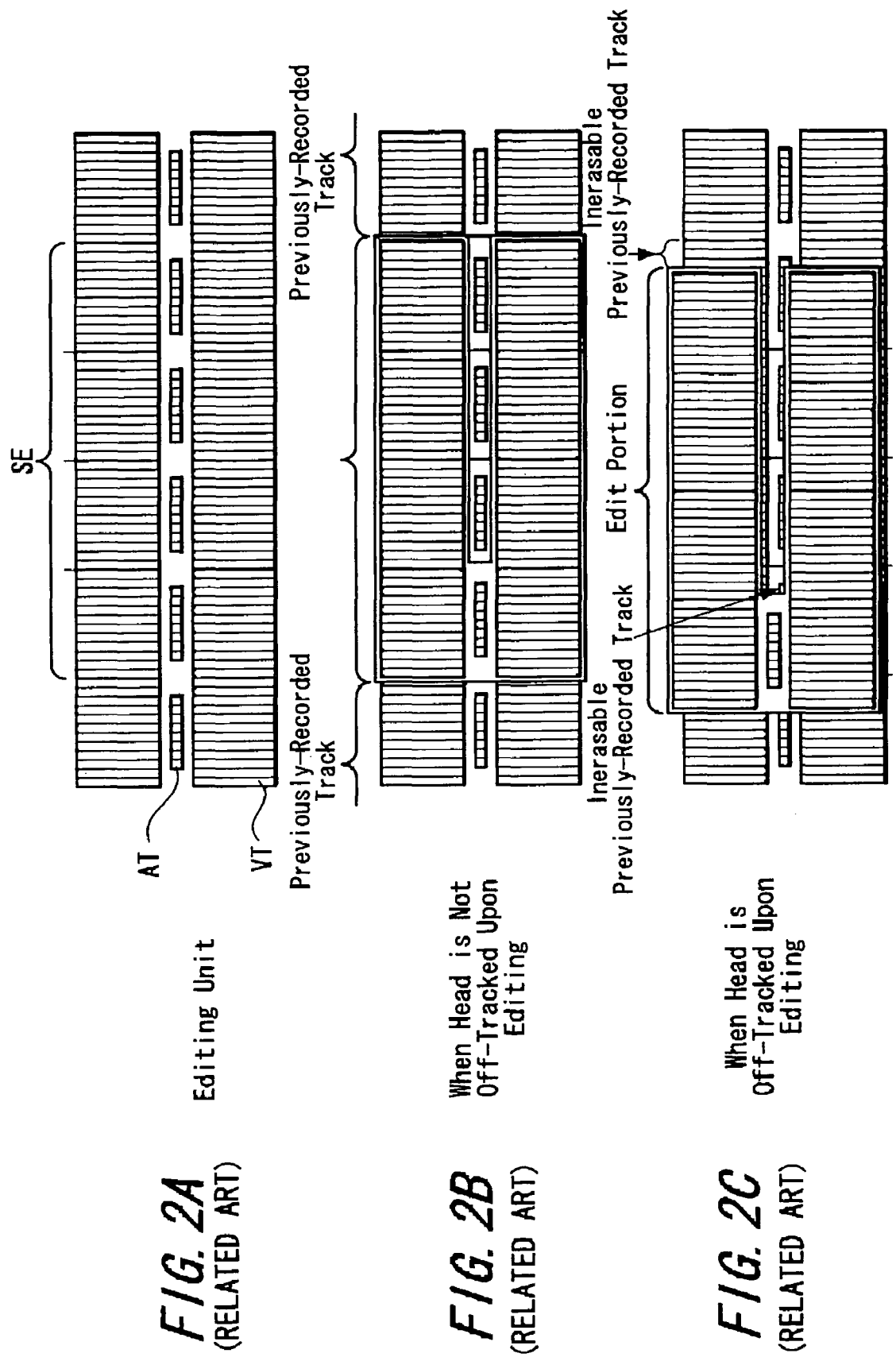

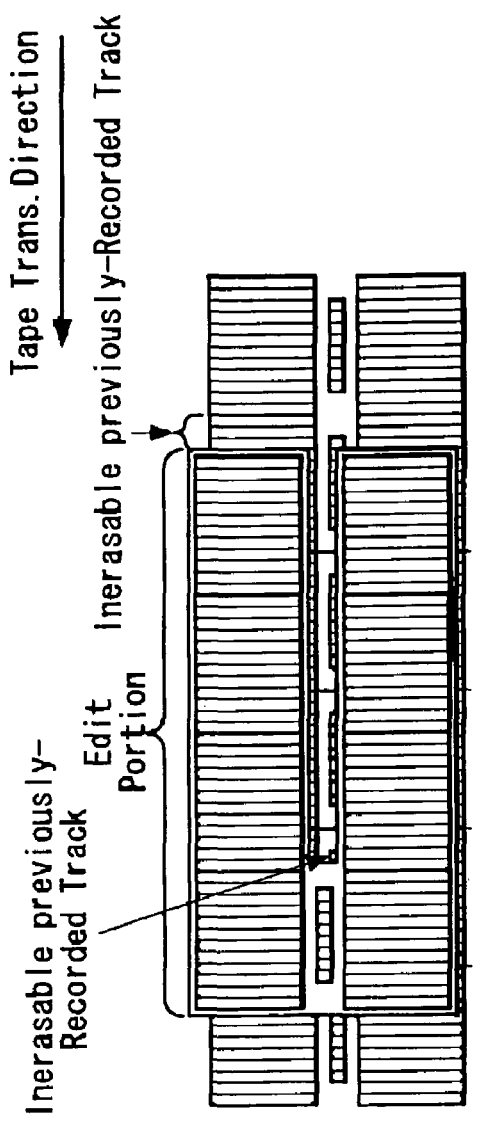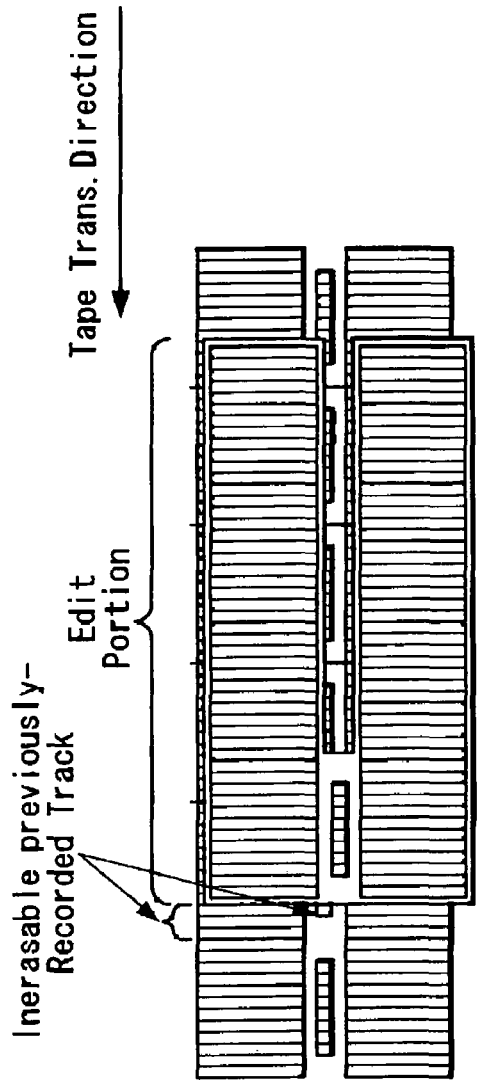
FIG. 10A When Head is Off-Tracked (Advanced) Upon Editing
FIG. 10B When Head is Off-Tracked (Delayed) Upon Editing Sync Block Data of Inerasable Previously-Recorded track Sync Block of Editing Portion

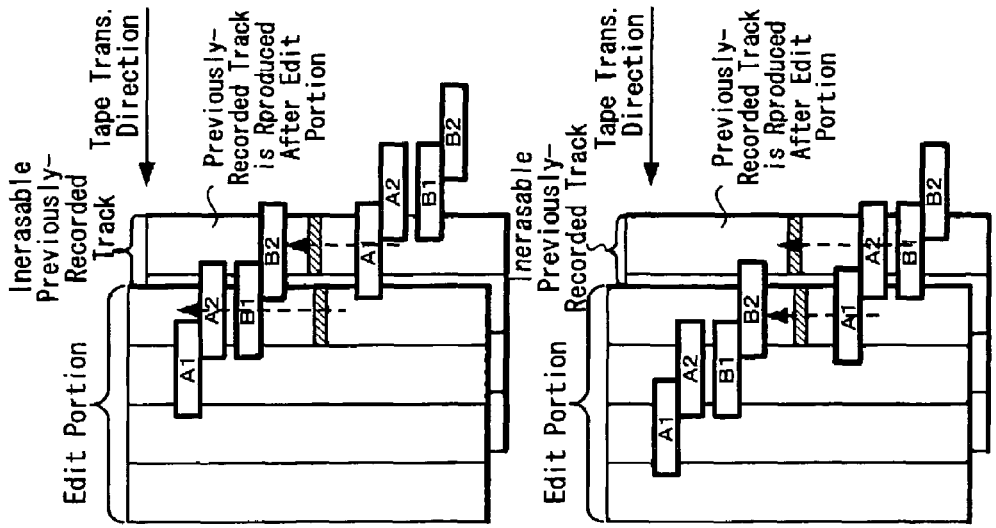
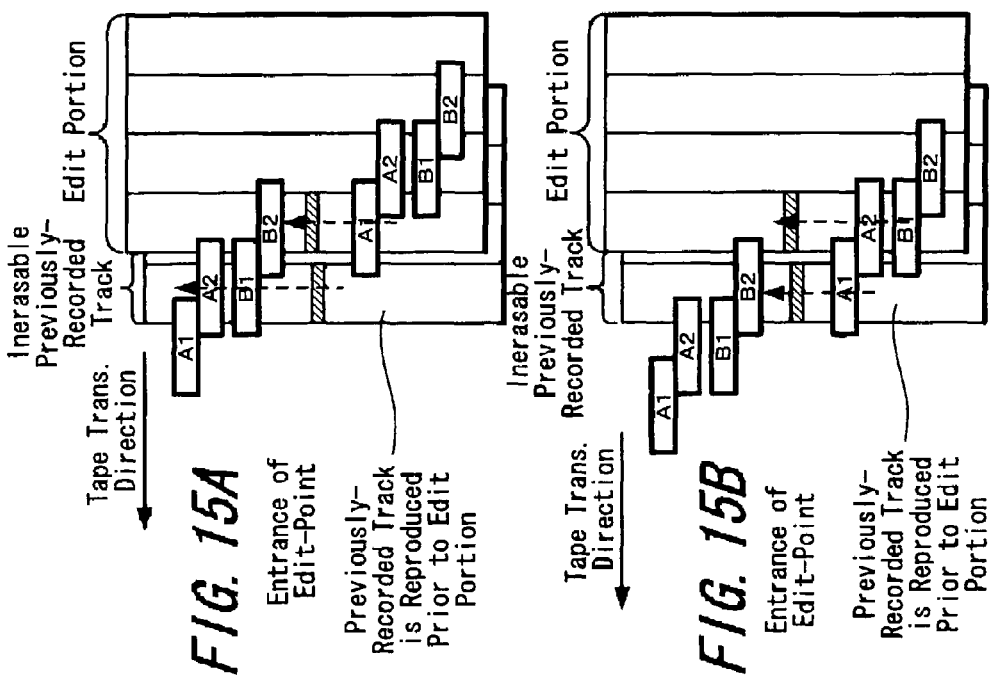

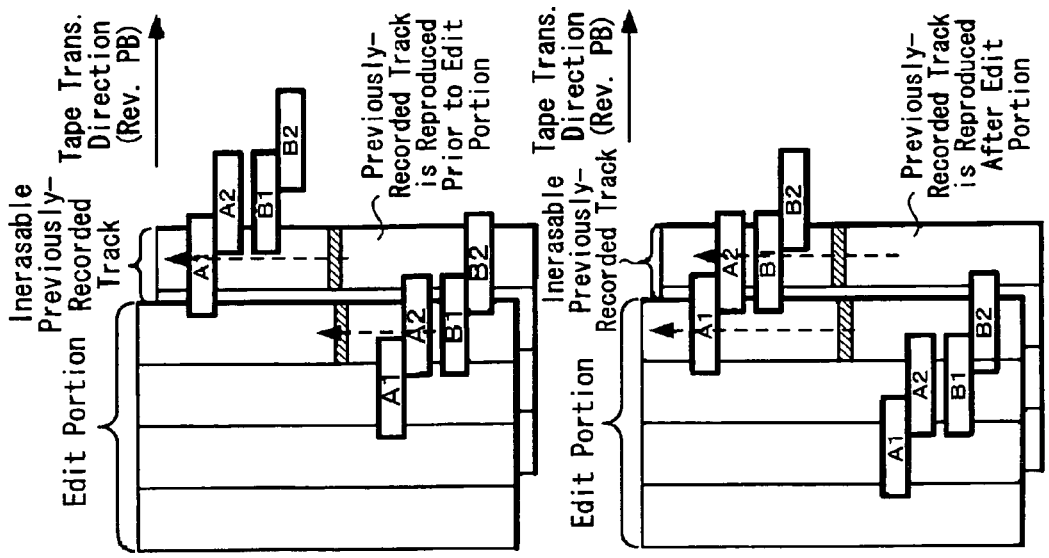
FIG. 16C Exit of Edit-Point
FIG. 16D Exit of Edit-Point
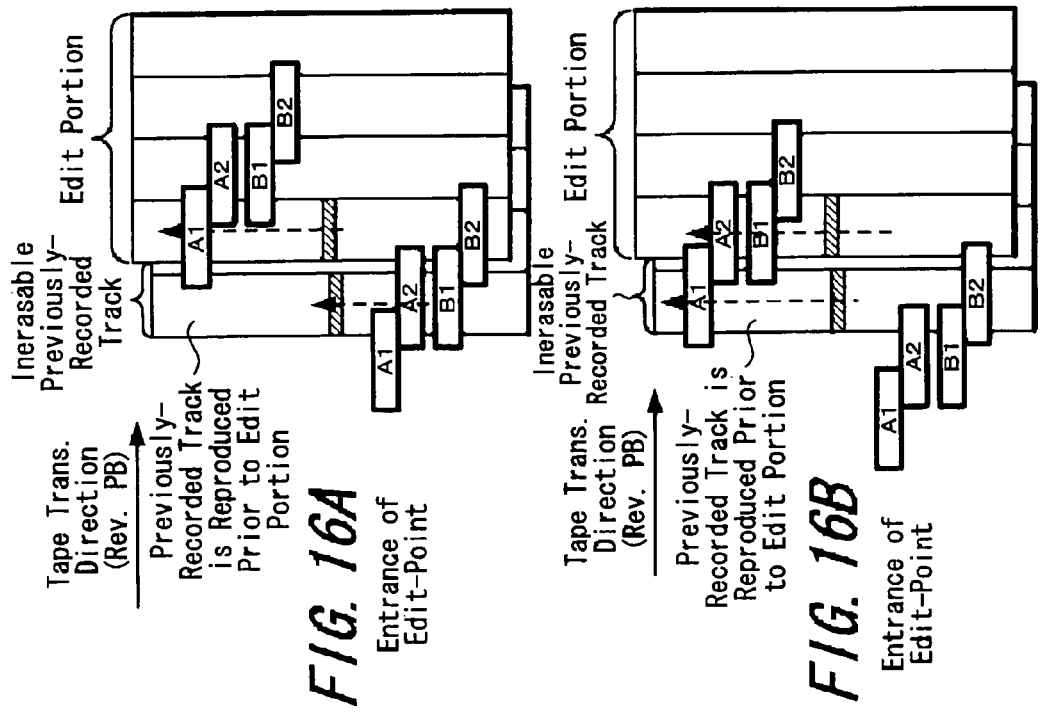
FIG. 16A Entrance of Edit-Point
FIG. 16B Entrance of Edit-Point Entrance of Edit-Point Entrance of Edit-Point

DATA REPRODUCING APPARATUS AND DATA REPRODUCING METHOD

BACKGROUND OF THE INVENTION

1. Field of the Invention

The present invention relates to a data reproducing apparatus such as a VTR (video tape recorder) capable of reproducing recorded data in a non-tracking reproducing fashion and a data reproducing method thereof.

2. Description of the Related Art

In recent years, in the recording format of the VTR, recording density is increased more in response to the demand of improving quality of image increasingly. To this end, a track pitch of a video tape is extremely decreased to be less than 10 µm.

As the track pitch is narrowed extremely as described above, even when the same track is scanned only once by one reproducing head ("just-tracking reproduction"), due to very small extension and contraction of the video tape and mechanical accuracy of a tape transport system, an off-track amount exceeds a range in which reproduced data can be error-corrected by C1 error correction (error-correction using inner parity) and hence recorded data cannot be reproduced accurately.

Accordingly, "non-tracking reproduction" exists as a reproducing method suitable for such case. In this non-tracking reproduction, after the same track was scanned by a plurality of reproducing heads or the same track was scanned by a single reproducing head a plurality of times and reproduced data obtained by the above-mentioned scanning was error-corrected by the C1 error correction, only reproduced data error-corrected by this C1 error correction was written in a memory and data read out from this memory is error-corrected by C2 error correction (error-correction using outer parity).

FIGS. 1A and 1B of the accompanying drawings are respectively schematic diagrams showing the range in which data reproduced by the non-tracking reproduction can be error-corrected by C1 error correction in contrast with the range in which data reproduced by the just-tracking reproduction can be error-corrected by C1 error correction.

In the case of the just-tracking reproduction in which the same track tr is scanned by one reproducing head A only once as shown in FIG. 1A, an off-track range (shown hatched in FIG. 1A) in which reproduced data can be error-corrected by C1 error correction is narrow. On the other hand, in the case of the non-tracking reproduction in which the same track tr is scanned by two reproducing heads A1 and A2 (reproducing heads with equal azimuth angles) as shown in FIG. 1B, reproduced data can be completely error-corrected in the off-track range (shown hatched in FIG. 1B) in which reproduced data can be error-corrected by C1 error correction.

In the VTR, splice editing for splicing other image to a certain scene of the previously-recorded image or insert editing for inserting other image into a certain range of the previously-recorded image are carried out frequently. If the track pitch is very narrow, then upon editing, a recording head is off-tracked from the track in which image was previously recorded so that the track in which image was recorded previously cannot be erased and remains inerasable although it should be erased by overwriting. For simplicity, the track in which image was recorded previously will hereinafter be referred to as a "previously-recorded track".

FIGS. 2A to 2C are schematic diagrams used to explain the above-mentioned inerasable previously-recorded track. As shown in FIG. 2A, 48 video tracks VT divided into upper and lower sectors and 8 audio tracks AT provided between the upper and lower sectors of the video tracks VT are handled as a segment SE which is the minimum unit of editing.

FIG. 2B shows the state in which the recording head is not off-tracked from the previously-recorded track upon insert editing using one central segment SE in FIG. 2A as an object to be edited. At that time, since an edit portion (portion in which data is recorded actually upon editing) is completely overlapping with the segment SE to be edited, the previously-recorded track which has been recorded on the segment SE to be edited is completely erased by overwriting and the inerasable previously-recorded track does not exist (the previously-recorded tracks at both sides of the edit portion are the previously-recorded tracks recorded on other segments adjacent to the segment SE that should be edited).

On the other hand, FIG. 2C shows the state in which the recording head is off-tracked from the previously-recorded track upon insert editing using one central segment SE in FIG. 2A as an object to be edited. At that time, since the edit portion is shifted from the segment SE that should be edited, the previously-recorded track recorded on the segment SE to be edited is left inerasable.

When the video tape with the inerasable previously-recorded track left thereon as shown in FIG. 2C is reproduced by the non-tracking reproduction, inerasable previously-recorded tracks error-corrected by C1 error correction are collected and further error-corrected by C2 error correction. As a result, C2 error correction capability is lowered and hence it becomes impossible to reproduce the edited data correctly.

As described above, in the non-tracking reproduction, it becomes important to exclude the inerasable previously-recorded track from the track that should be error-corrected by C2 error correction. As a method for excluding the inerasable previously-recorded track from the track that should be error-corrected by C2 error correction, there has been so far proposed a method of inserting edit data ID (Edit ID), which is used to identify the inerasable previously-recorded track, into ID (identification data) of SYNC (synchronizing) block and which method uses the Edit ID (for example, see cited patent references 1 and 2).

[Cited patent reference 1]: Official gazette of Japanese laid-open patent application No. 9-266563

[Cited patent reference 1]: Official gazette of Japanese laid-open patent application No. 9-312090

Specific examples of the above-mentioned method according to the related art will be described with reference to FIGS. 3 and 4. FIG. 3 is a schematic diagram showing an example of the Edit ID, inserted into the ID of the SYNC block, together with an ECC (error correction code) block composed of the predetermined number of SNYC blocks. An Edit ID (ID2) of 8 bits for identifying the inerasable previously-recorded track is inserted into the ID of the SYNC block together with a sync number (ID0), a track number (ID1), etc.

FIG. 4 is a block diagram showing a recording and reproducing system of a non-tracking reproduction system VTR according to the related art which can exclude the inerasable previously-recorded track by using this Edit ID.

As shown in FIG. 4, this VTR includes a recording system comprising a video compressor 51, a SYNC/ID/parity adder 52, recording circuits 53 and 54 and recording heads 55 (a head A with a positive azimuth angle and a head B with a negative azimuth angle).

Also, this VTR includes an ordinary reproducing system (video/audio reproducing system) comprising reproducing heads 56 (heads A1 and A2 with positive azimuth angles and heads B1 and B2 with negative azimuth angles), equalizing and decoding circuits 57 to 60, C1 error correctors 61 to 64, a non-tracking processing circuit 65, an Edit ID detector 66, a C2 error corrector 67 and a video expander 68.

Also, independently of the above-mentioned ordinary reproducing system, this related-art VTR includes a reproducing system for detecting the Edit ID from the previously-recorded track. This reproducing system is composed of advance heads 69 (heads A1 and A2 with positive azimuth angles and heads B1 and B2 with negative azimuth angles) for reproducing the previously-recorded track prior to the recording of the edit portion, equalizing and decoding circuits 70 to 73, C1 error correctors 74 to 77 and a previously-recorded track Edit ID detector 78.

In this VTR, upon normal recording (when the previously-recorded track is made), after a video signal to be recorded was band-limited by the video compressor 51 and compressed by bit reduction, the SYNC/ID/parity adder 52 adds SYNC, ID, inner parity and outer parity to the resultant compressed video signal as shown in FIG. 3 to constitute the SYNC block/ECC block.

Also, in a like manner, the SYNC/ID/parity adder 52 adds SYNC, ID, inner parity and outer parity to a non-compressed audio signal to be recorded to constitute the SYNC block/ECC block.

Then, output data from the SYNC/ID/parity adder 52 are respectively converted into recording currents by the recording circuits 53, 54 and recorded on a video tape TP by the recording heads 55.

After the previously-recorded track was made as described above, upon editing, prior to the recording of new video/audio signals, signals reproduced from the video tape TP by the advance heads 69 are respectively equalized, decoded and C1 error-corrected by the equalizing and decoding circuits 70 to 73 and the C1 error correctors 74 to 77, and Edit IDs are detected from the output data of the C1 C1 error correctors 74 to 77 by the Edit ID detector 78.

Then, the SYNC/ID/parity adder 52 adds SYNC, ID, inner parity and outer parity to the Edit ID, which results from adding "1" to the Edit ID detected by the previously-recorded track detector 78 to the video signal compressed by the video compressor 51 and the non-compressed audio signal, to thereby construct the SYNC block/ECC block.

Then, output data from the SYNC/ID/parity adder 52 are respectively converted into recording currents by the recording circuits 53, 54 and recorded on the video tape TP by the recording heads 55.

On the other hand, upon reproduction, reproduced signals reproduced from the video tape TP by the reproducing heads 56 are respectively equalized, decoded and C1 C1 error-corrected by the equalizing and decoding circuits 57 to 60 and the C1 error correctors 61 to 64 and output data from the C1 error correctors 61 to 64 are supplied to the non-tracking processing circuit 65. At the same time, the Edit ID is detected from the output data of the C1 error correctors 61 to 64 by the Edit ID detector 66.

The non-tracking processing circuit 65 carries out the non-tracking processing. That is, of the reproduced data C1 error-corrected by the C1 error correctors 61 to 64, data of the SYNC block in which the Edit ID detected by the Edit ID detector 66 agrees with the Edit ID added upon editing is written in a memory (not shown) but data of other SYNC blocks are not written in the memory and data read out from this memory is supplied to the C2 C2 error corrector 67. Thus, the inerasable previously-recorded track can be excluded from those to be C2 C2 error-corrected by the C2 C2 error corrector 67.

Then, the reproduced data from the non-tracking processing circuit 65 is C2 error-corrected by the C2 error corrector 67 and video data of the output data from the C2 error corrector 67 is expanded by the video expander 68, whereby a reproduced video signal and a reproduced audio signal can be obtained.

However, according to the above-mentioned related-art method, since the Edit ID is inserted into the ID of the SYNC block, it is unavoidable that the bit number of the ID is increased (8 bits are increased in the example shown in FIG. 3). Then, there is a disadvantage in which substantial recording densities of the video and audio signals are lowered.

Further, as shown in FIG. 4, since the data reproducing system (VTR) according to the related art should include the reproducing system (reproducing heads and signal processing circuits) exclusively-designed for detecting the Edit ID from the previously-recorded track, there are disadvantages in which a rotary drum becomes difficult to be miniaturized and in which a circuit arrangement becomes complex.

SUMMARY OF THE INVENTION

In view of the aforesaid aspect, it is an object of the present invention to provide a data reproducing apparatus and a data reproducing method in which an inerasable previously-recorded track can be excluded from those to be C2 error-corrected by a C2 error corrector without inserting the Edit ID into the ID of the SYNC block or without providing a reproducing system for detecting the Edit ID from the previously-recorded track upon editing.

According to an aspect of the present invention, there is provided a data reproducing system data reproducing apparatus in which a plurality of reproducing heads scans the same track on a tape-like recording medium or a single reproducing head scans the same track on the tape-like recording medium a plurality of times, reproduced data obtained by respective scanning is error-corrected at every predetermined recording block by using inner parity (C1 error correction), reproduced data error-corrected by the error correction is written in a memory and reproduced data read out from the memory is error-corrected by using outer parity (C2 error correction). This data reproducing apparatus is comprised of an identifying unit for setting tracks of the number of a part of the rear side of tracks of the predetermined number serving as the editing minimum unit to a pre-writing priority area and remaining tracks to a post-writing priority area, respectively, and determining whether or not reproduced data of a recording block having the same identification data (ID) as that of a recording block has already been written in the memory with respect to each recording block reproduced from the pre-writing priority area and which is error-corrected by C1 error-correction and a control unit for allowing reproduced data of the recording block of which reproduced data was not yet written in the memory as determined by the identifying unit to be written in the memory and inhibiting reproduced data of the recording block of which reproduced data was already written in the memory as determined by the identifying unit from being written in the memory.

According to this data reproducing system reproducing apparatus, of the tracks of the predetermined number which becomes the minimum editing unit, tracks of the number of a part of the rear side are set to the pre-writing priority area. Then, with respect to each recording block reproduced from this pre-writing priority area and which is error-corrected by C1 error correction, it is determined whether or not reproduced data of the recording block having the same ID as that of the recording block was already written in the memory. The reproduced data of the recording block of which reproduced data was already written in the memory as determined by the above identification can be inhibited from being written in the memory.

The track of the rear side of the editing unit which was set to the pre-writing priority area is the track in which the edit portion is reproduced from the recording block of the same ID prior to the inerasable previously-recorded track when the inerasable previously-recorded track exists at the rear end side of the edit portion.

Accordingly, even when the inerasable previously-recorded track exists at the rear end side of the edit portion, since the reproduced data of each recording block from the edit portion is written in the memory prior to the inerasable previously-recorded track, the reproduced data of the recording block of the same ID from the inerasable previously-recorded track can be inhibited from being written in the memory. Thus, the data reproduced from the inerasable previously-recorded track and which is error-corrected by C1 error correction can be prevented from being error-corrected by C2 error correction.

On the other hand, the track of the front side of the editing unit set to the post-writing priority area is the track in which the recording block of the same ID is reproduced from the inerasable previously-recorded track prior to the edit portion when the inerasable previously-recorded track exists at the front end side of the edit portion.

Accordingly, when the inerasable previously-recorded track exists at the front end side of the edit portion, although the reproduced data from each recording block from the inerasable previously-recorded track is temporarily written in the memory, such reproduced data is overwritten and erased by the reproduced data of the recording block of the same ID from the edit portion later on. As a result, the data reproduced from the inerasable previously-recorded track and which is error-corrected by C1 error correction can be inhibited from being error-corrected by C2 error correction.

In this manner, according to this data reproducing apparatus, since the front end and the rear end of the editing unit are discriminated into and set to the post-writing priority area and the pre-writing priority area and written in the memory, even when the inerasable previously-recorded track exists in any one of the front end side and the rear end side of the edit portion, the inerasable previously-recorded track can be excluded from those to be error-corrected by C2 error correction.

As a result, unlike the related art in which the Edit ID is inserted into the ID of the SYNC block and in which the data reproducing apparatus includes the reproducing system for detecting the Edit ID of the inerasable previously-recorded track upon editing, the inerasable previously-recorded track can be excluded from those to be error-corrected by C2 error correction upon editing.

In this data reproducing apparatus, by way of example, when the tape-like recording medium is transported in the opposite direction and reproduced (reverse reproduction), it is suitable for the identifying unit to set the tracks of the number of a part of the front side of the tracks of the predetermined number serving as the editing unit to the pre-writing priority area and to set the remaining tracks to the post-writing priority area, respectively.

As described above, if the pre-writing priority area and the post-writing priority area in the editing unit are set in the opposite fashion, then in the reverse reproduction, it becomes possible to exclude the inerasable previously-recorded track from those to be error-corrected by C2 error correction.

However, when a plurality of reproducing heads with the same azimuth angle is mounted on the rotary drum with unequal angular extents, since the heights of these reproducing heads are different on the rotary drum, the reproducing head mounted on the rotary drum at the high position reproduces data prior to the reproducing head mounted on the rotary drum at the low position so that it is frequently observed that the reproducing order in which the recording block of the same ID is reproduced from the inerasable previously-recorded track and the edit portion will become the same in the reverse reproduction and the normal reproduction (forward reproduction). For this reason, only if the setting of the pre-writing priority area and the post-writing priority area is made opposite, in the reverse reproduction, the inerasable previously-recorded track cannot be excluded from those to be error-corrected by C2 error correction.

Accordingly, in that case, in addition to the arrangement in which the setting of the pre-writing priority area and the post-writing priority area is made opposite, it is suitable that this data reproducing apparatus further includes a delay unit for delaying the reproduced signal reproduced by the reproducing head mounted on the rotary drum at the high position from the reproduced signal reproduced by the reproducing head mounted on the rotary drum at the low position of a plurality of reproducing heads in the reverse reproduction.

In consequence, since the reproducing order in which the recording blocks of the same ID are reproduced from the inerasable previously-recorded track and the edit portion constantly becomes opposite in the reverse reproduction and the forward reproduction, it becomes possible to constantly exclude the inerasable previously-recorded track from those to be error-corrected by C2 error correction also in the reverse reproduction.

A data reproducing method in which a plurality of reproducing heads scans the same track on a tape-like recording medium or a single reproducing head scans the same track on the tape-like recording medium a plurality of times, reproduced data obtained by respective scanning is error-corrected at every predetermined recording block by C1 error correction, reproduced data error-corrected by the C1 error correction is written in a memory and reproduced data read out from the memory is error-corrected by C2 error correction. This non-tracking data reproducing method is comprised of a first step for setting tracks of the number of a part of the rear side of tracks of the predetermined number serving as the minimum editing unit to a pre-writing priority area and remaining tracks to a post-writing priority area, respectively, and determining whether or not reproduced data of a recording block having the same identification data as that of a recording block has already been written in the memory with respect to each said recording block reproduced from the pre-writing priority area and which is error-corrected by C1 error correction and a second step for allowing reproduced data of the recording block of which reproduced data was not yet written in the memory as determined at the first step to be written in the memory and inhibiting reproduced data of the recording block of which reproduced data was already written in the memory as determined at the first step from being written in the memory.

According to this data reproducing method, in exactly the same manner as that has been described so far with respect to the aforementioned data reproducing apparatus of the present invention, unlike the related art in which the Edit ID is inserted into the ID of the SYNC block and in which the data reproducing method includes the reproducing system for detecting the Edit ID of the inerasable previously-recorded track upon editing, the inerasable previously-recorded track can be excluded from those to be error-corrected by C2 error correction upon editing.

Also in this data reproducing method, by way of example, when the tape-like recording medium is transported in the opposite direction and reproduced, it is suitable for the first step to set the tracks of the number of a part of the front side of the tracks of the predetermined number serving as the editing unit to the pre-writing priority area and to set the remaining tracks to the post-writing priority area. Further, upon reverse reproduction, it is suitable that the reproduced signal reproduced by the reproducing head mounted on the rotary drum at the high position of a plurality of reproducing heads should be delayed from the reproduced signal reproduced by the reproducing head mounted on the rotary drum at the low position.

As a consequence, in exactly the same manner as that has been described so far with respect to the aforementioned data reproducing apparatus of the present invention, it becomes possible to constantly exclude the inerasable previously-recorded track from those to be C2 error-corrected by the C2 error corrector also in the reverse reproduction.

BRIEF DESCRIPTION OF THE DRAWINGS

FIGS. 1A and 1B are schematic diagrams showing the ranges in which reproduced data can be error-corrected by C1 error correction relative to the off-track amounts in the just-tracking reproduction and the non-tracking reproduction, respectively;

FIGS. 2A to 2C are schematic diagrams showing examples of inerasable previously-recorded track upon insert editing, respectively;

FIGS. 10A and 10B are schematic diagrams showing examples of inerasable previously-recorded tracks produced when the head is off-tracked upon insert editing, respectively;

FIGS. 15A to 15D are schematic diagrams showing the orders in which the inerasable previously-recorded track and the edit portion are reproduced by the reproducing heads with different heights on the rotary drums upon forward reproduction, respectively;

FIGS. 16A to 16D are schematic diagrams showing the orders in which the inerasable previously-recorded track and the edit portion are reproduced by the reproducing heads with different heights on the rotary drums upon reverse reproduction, respectively;

DESCRIPTION OF THE PREFERRED EMBODIMENTS

A data reproducing apparatus and a data reproducing method according to the embodiments of the present invention will hereinafter be described in detail with reference to the drawings.

Figure 5:
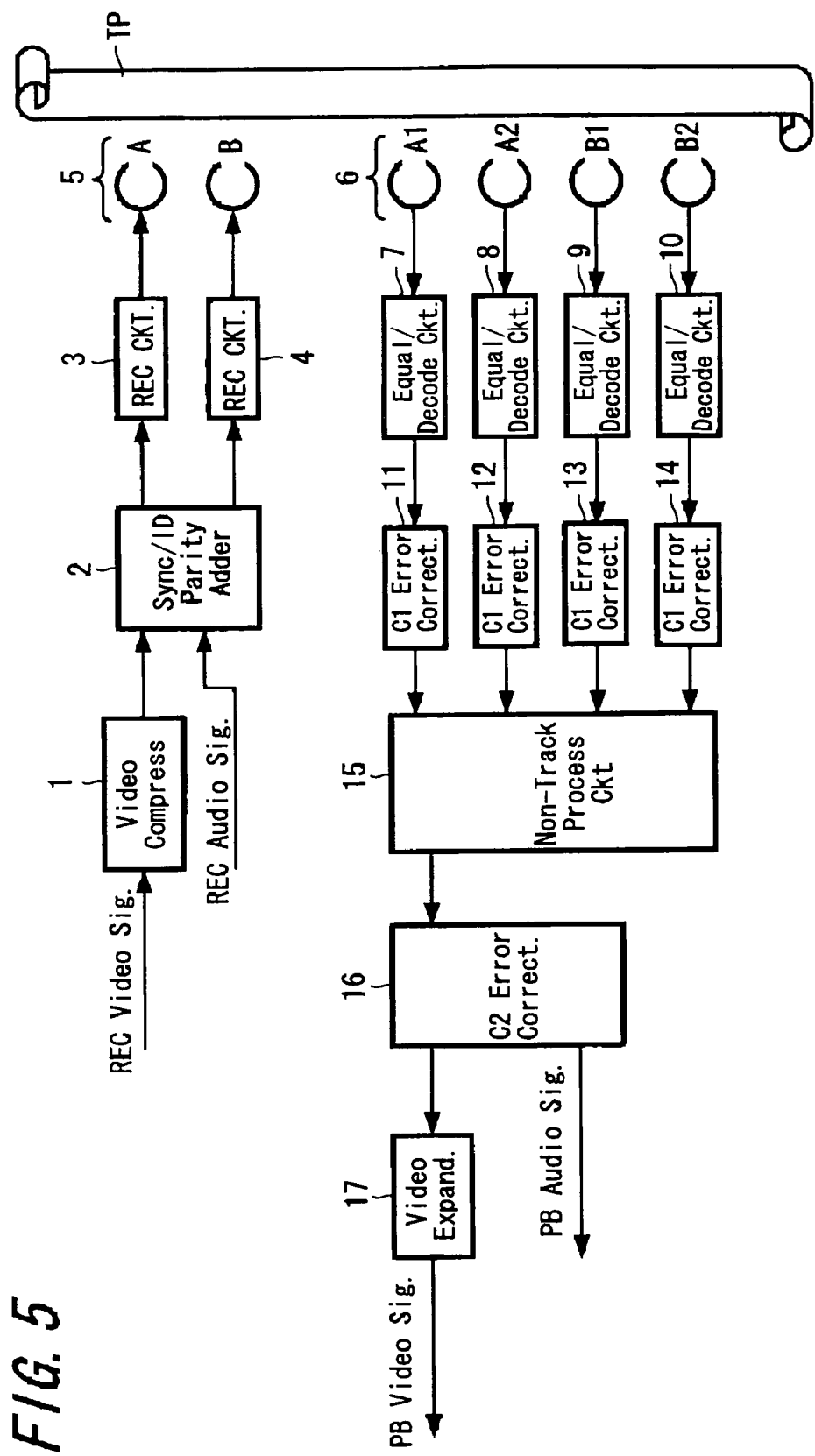
FIG. 5 is a block diagram showing an example of an arrangement of a recording and reproducing system of a non-tracking reproduction system VTR to which the present invention is applied.

FIG. 5 is a schematic block diagram showing an arrangement of a recording and reproducing system of a non-tracking reproducing system VTR.

As shown in FIG. 5, this VTR includes a recording system comprising a video compressor 1, a SYNC/ID/parity adder 2, recording circuits 3 and 4, recording heads 5 (a head A with a positive azimuth angle and a head B with a negative azimuth angle).

As shown in FIG. 5, this VTR includes a reproducing system comprising reproducing heads 6 (heads A1 and A2 with positive azimuth angles and heads B1 and B2 with negative azimuth angles), equalizing and decoding circuits 7 to 10, C1 error correctors 11 to 14, a non-tracking processing circuit 15, a C2 error corrector 16 and a video expander 17.

In this VTR, upon recording (when video data is recorded first before editing and when recorded video data is edited), after a recorded video signal was band-limited and compressed by bit reduction with the video compressor 1, the SYNC/ID/parity adder 2 adds the SYNC, ID, inner parity and outer parity to this compressed video signal to construct the SYNC block/ECC block.

Also, in a like manner, the SYNC/ID/parity adder 2 adds the SYNC, ID, inner parity and outer parity to a non-compressed audio signal to be recorded to construct the SYNC/ECC block.

Figure 6:
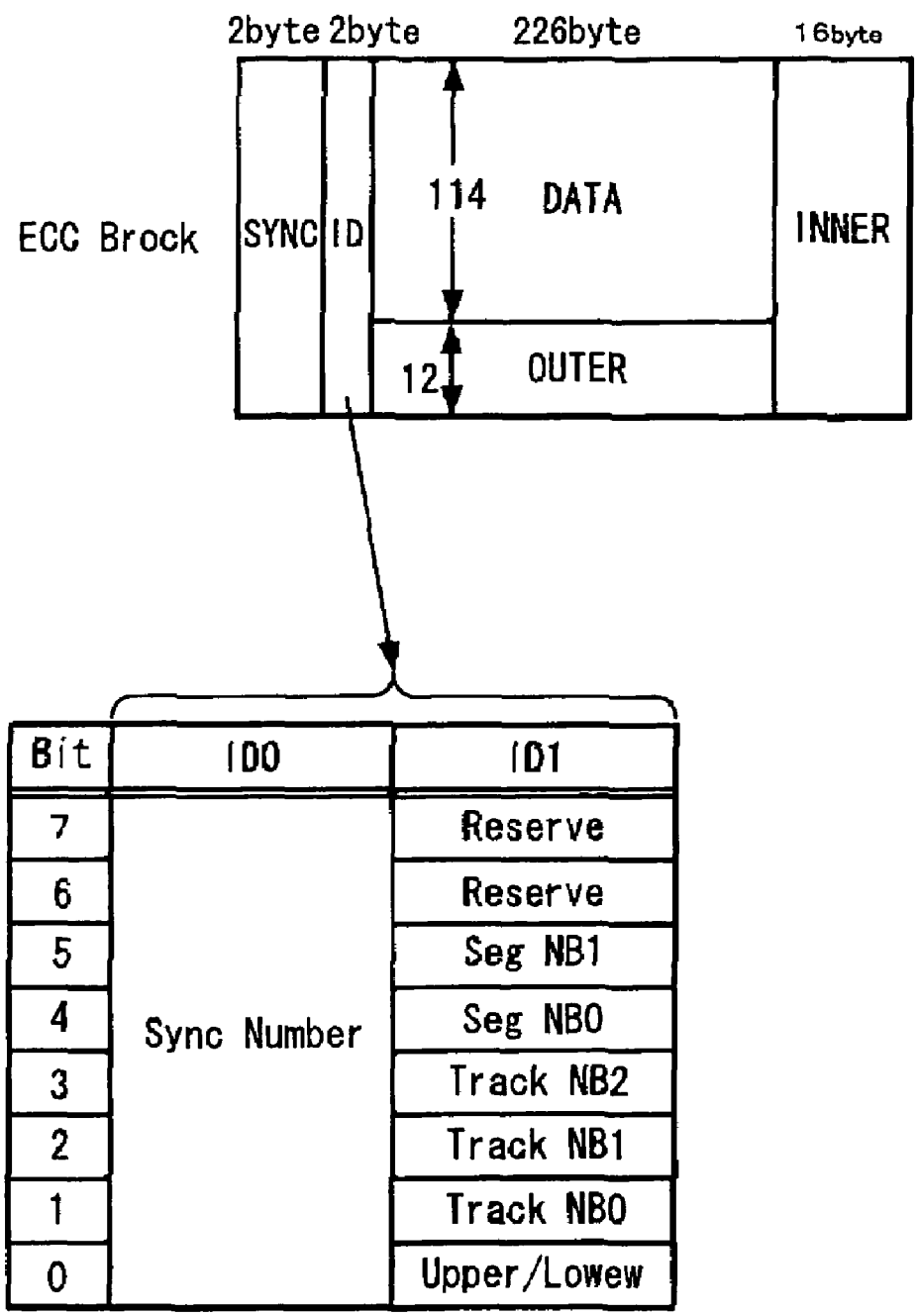
FIG. 6 is a schematic diagram showing sync data, ID, outer code and inner code added by a SYNC/ID/parity adder shown in FIG. 5.

FIG. 6 is a diagram showing the ID of each SYNC block together with an ECC block composed of a plurality of SYNC blocks with respect to the compressed video signal. Although the ID contains a sync number (ID0) and a track number (ID1), etc., the ID does not contain the Edit ID (ID2) shown in FIG. 3.

Also, with respect to the compressed video signal, 36 ECC blocks are recorded on 48 video tracks (one segment serving as the editing unit which will be described later on), for example.

As shown in FIG. 5, output data from the SYNC/ID/parity adder 2 are respectively converted into recording currents by the recording circuits 3, 4 and recorded on the video tape TP by the recording heads 5.

On the other hand, upon reproduction, signals reproduced from the video tape TP by the reproducing heads 6 are equalized and decoded by the equalizing and decoding circuits 7 to 10, and output data from the equalizing and decoding circuits 7 to 10 are error-corrected by C1 error correction (error-correction using inner parity) at every SYNC block with the C1 error correctors 11 to 14. Then, reproduced data to which a flag for indicating whether or not output data are error-corrected is added at every SYNC block are supplied from the C1 error correctors 11 to 14 to the non-tracking processing circuit 15.

The non-tracking processing circuit 15 is adapted to correct only the reproduced data of the SYNC blocks error-corrected by the C1 error correctors 11 to 14 and which is also used to exclude the reproduced data from the inerasable previously-recorded track upon editing.

Figure 7:
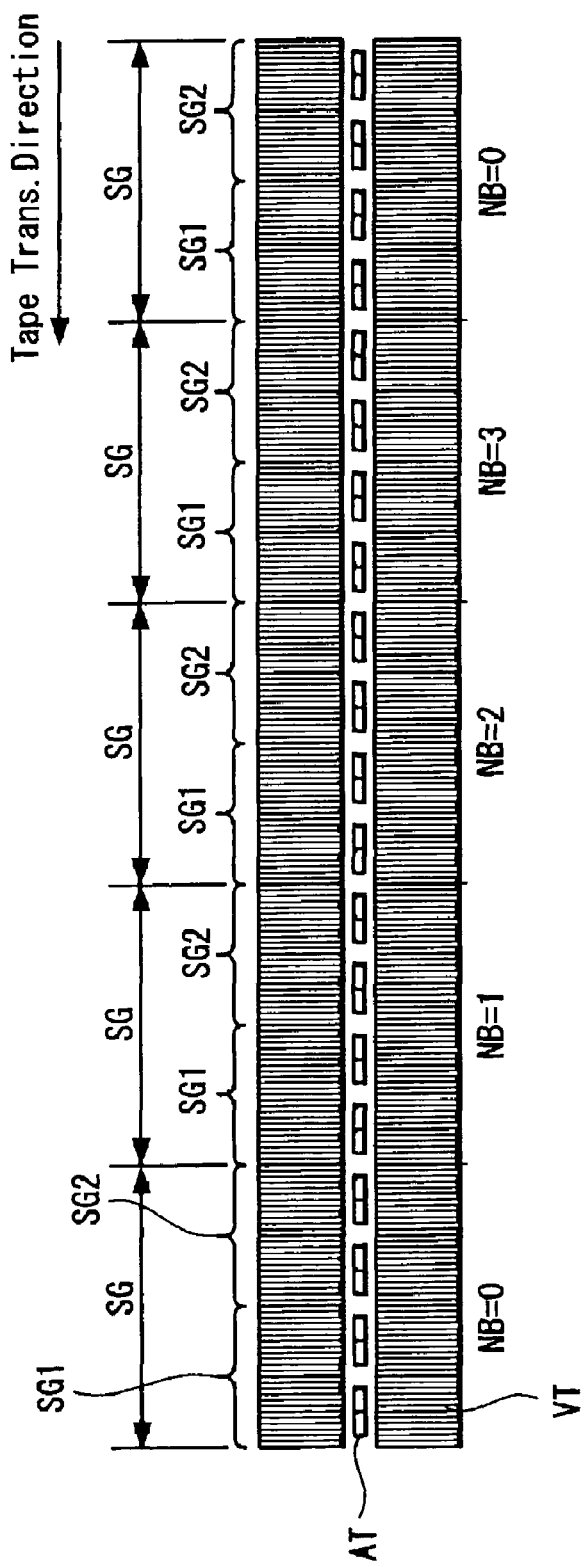
FIG. 7 is a schematic diagram showing the editing unit and post-writing priority area/pre-writing priority area in the VTR shown in FIG. 5.

As an assumption that the arrangement of the non-tracking processing circuit 15 will be described, the editing unit and "post-writing priority area/pre-writing priority area" of this VTR will be described. In this VTR, as shown in FIG. 7, 48 video tracks VT divided into upper and lower sectors and 8 audio tracks (one channel is shown as two tracks for simplicity of the sheet of the drawing) of one channel between the upper and lower sectors of the video tracks VT are treated as the segment SE which is the minimum editing unit. Segment numbers NB of NB=0 to NB=3 are repeatedly assigned to the respective segments SE.

In each segment SE, the first half 24 video tracks and 4 audio tracks AT are set to a "post-writing priority area SG1" and the second half 24 video tracks VT and 4 audio tracks AT are set to a "pre-writing priority area SG2" (although the tracks are helical tracks in actual practice, the longitudinal direction of the track is shown in the direction perpendicular to the tape transport direction for simplicity as shown in FIG. 7, and this relationship applies for other sheets of the drawings, that is, FIGS. 11A, 11B, FIG. 13, FIGS. 15A to 15D, FIGS. 16A to 16D and FIGS. 18A, 18B as well).

Figure 8:
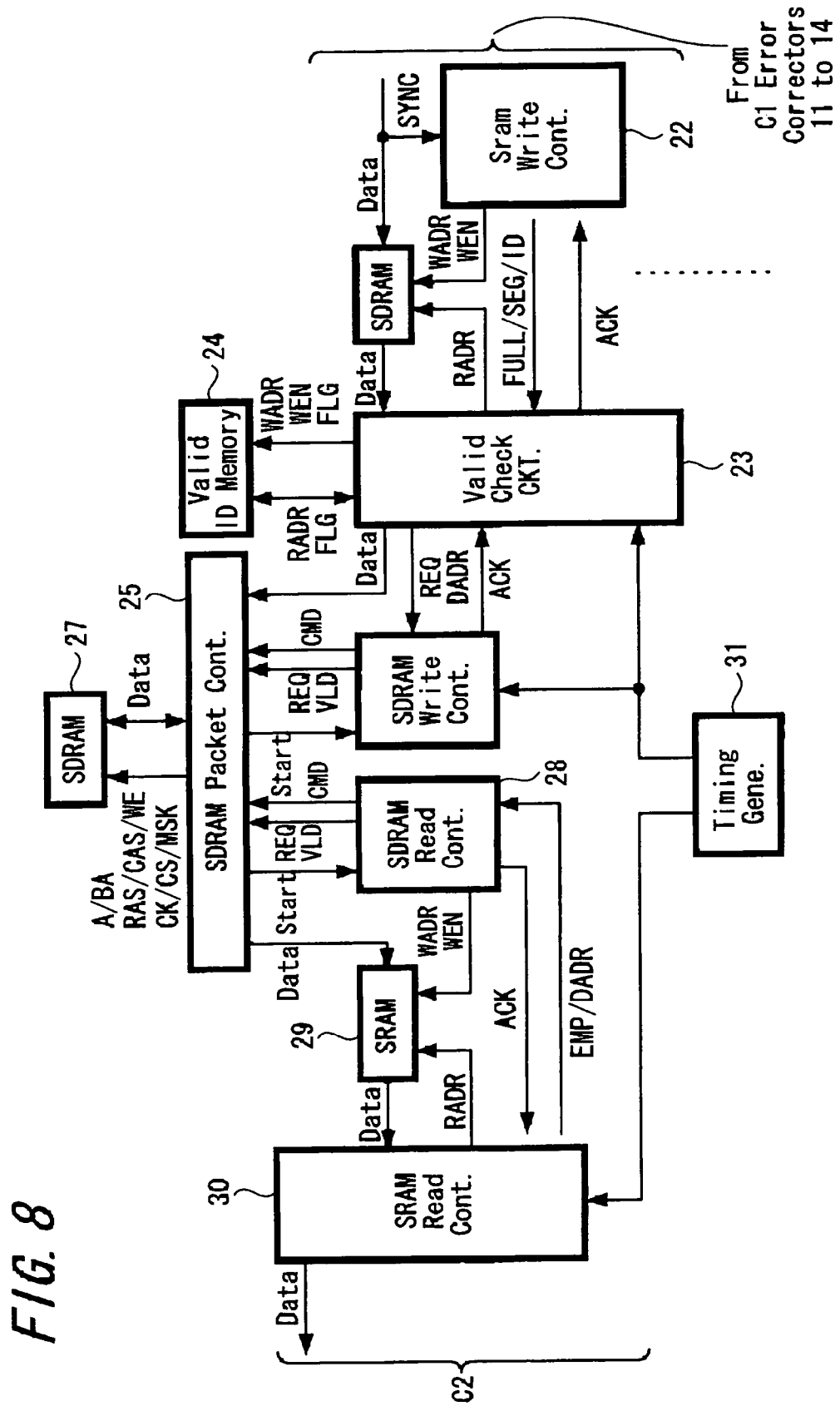
FIG. 8 is a block diagram showing an example of an arrangement of a non-tracking processing circuit shown in FIG. 5.

FIG. 8 is a block diagram showing more fully an example of an arrangement of the non-tracking processing circuit 15 shown in FIG. 5.

As shown in FIG. 8, the non-tracking processing circuit 15 includes four sets of SRAMs (static random-access memories) 21 and four sets of SRAM write controllers 22 (only one set of the SRAM 21 and the SRAM write controller 22 are shown in FIG. 8) in correspondence with the respective C1 error correctors 11 to 14 shown in FIG. 5.

Reproduced data DATA from the respective C1 error correctors 11 to 14 are supplied to the corresponding SRAMs 21, respectively. Also, the SYNC and the ID (see FIG. 6) in the reproduced data DATA from the respective C1 error correctors 11 to 14 and the aforementioned flag (flag indicating whether or not data is error-corrected) added to the reproduced data by the C1 error correctors 11 to 14 are supplied to the corresponding SRAM write controllers 22.

Only when a flag indicating that data was error-corrected is supplied to the SRAM write controller 22, the SRAM write controller 22 supplies a write address WADR and a write enable WEN to the SRAM 21 and thereby reproduced data of the SYNC block with the flag added thereto is written in the SRAM 21.

Then, each time reproduced data of one SYNC block is written in the SRAM 21, the SRAM write controller 22 supplies information FULL/SEG/ID composed of a full flag indicative of the fact that the SRAM 21 has no storage capacity to store any more data, the segment number (FIG. 7) and the ID (FIG. 6) of the reproduced data written in the SRAM 21 to a valid check circuit 23.

Figure 9:
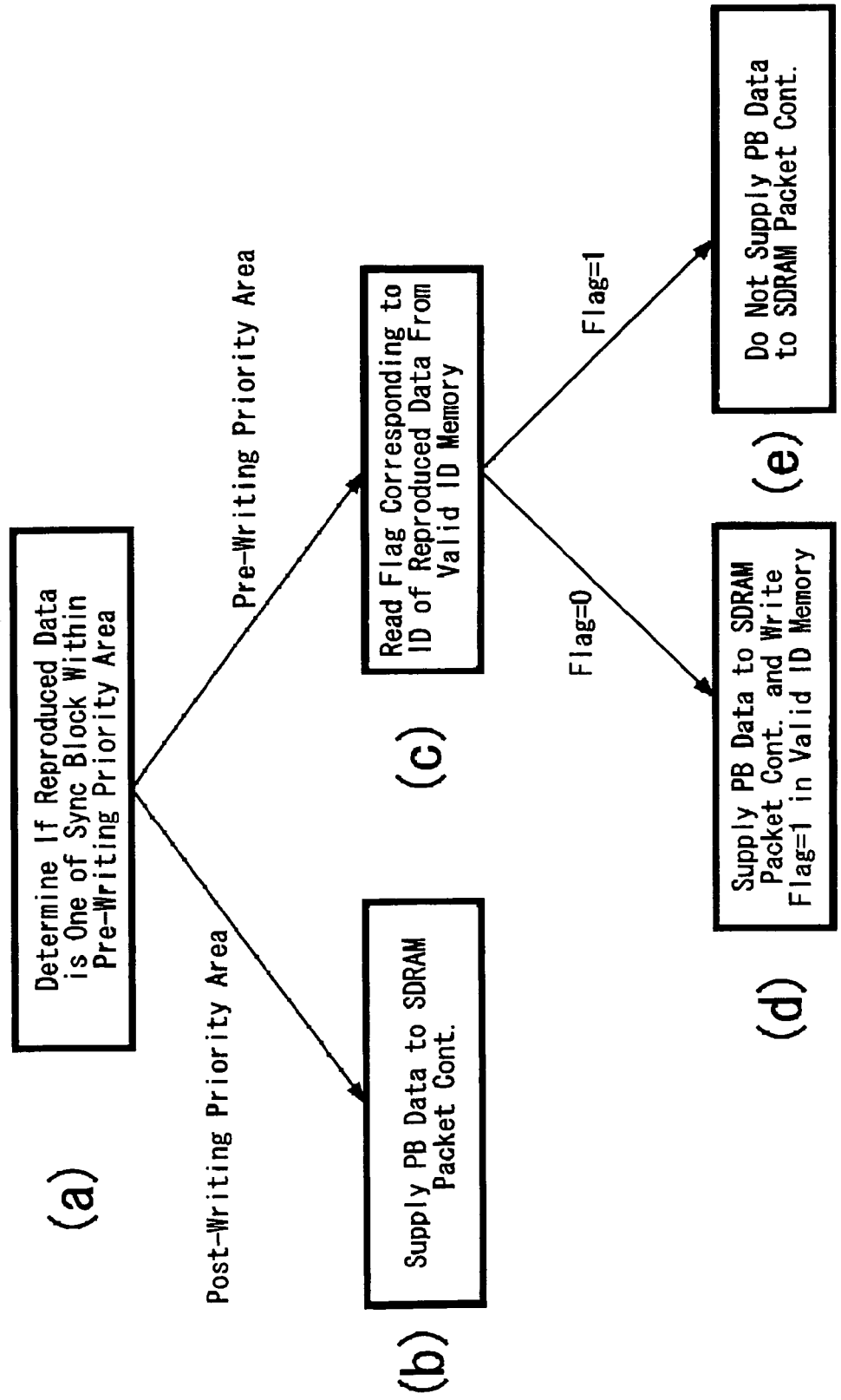
FIG. 9 is a schematic diagram to which reference will be made in explaining processing executed by a valid check circuit shown in FIG. 8.

The valid check circuit 23 comprises a microprocessor and executes the following processing (a) to (c) each time it receives this information FULL/SEG/ID. FIG. 9 is a diagram showing contents and procedures of the processing (a) to (c) executed by the valid check circuit 23 in brief.

(a) After an acknowledge ACK was returned to the SRAM write controller 22, the valid check circuit 23 reads out the reproduced data DATA of one SYNC block from the SRAM 21 by supplying the read address RADR to the SRAM 21. Then, it is determined by the valid check circuit 23 based on ID from the SRAM write controller 22 whether or not the reproduced data is the data of the SYNC block within the pre-writing priority area (FIG. 7).

(b) If it is determined by the valid check circuit 23 that the reproduced data is the data of the SYNC block within the post-writing priority area, then the valid check circuit 23 supplies the resultant reproduced data DATA to the SDRAM packet controller 25. Also, the valid check circuit 23 supplies a write request REQ and information DADR indicative of an address (destination address) at which data is to be written in the SDRAM 27 a SDRAM (static dynamic RAM) controller 26.

(c) If on the other hand it is determined by the valid check circuit 23 that the reproduced data is the data of the SYNC block within the pre-writing priority area, then the following pre-writing priority processing is executed by using the valid ID memory 24. The valid ID memory 24 is adapted to store therein one bit flag (initial value of this flag is assumed to be "0" and the flag "1" indicates that the reproduced data was already written in the SDRAM 27) which indicates whether or not the reproduced data of the SYNC block of each SYNC block ID was already written in the SDRAM 27 in response to the ID of each SYNC block within the pre-writing priority area. The valid check circuit 23 reads a flag FLG corresponding to the ID of the reproduced data of one SYNC block from the SRAM 21 by supplying the read address RADR to this valid ID memory 24.

(d) If it is determined by the valid check circuit 23 that the above-mentioned flag is held at "0", then similarly to the processing (b), the valid check circuit 23 supplies the reproduced data DATA to the SDRAM packet controller 25 and it also supplies the write request REQ and the read address DADR to the SDRAM write controller 26. Also, the valid check circuit 23 stores the flag "1" in the valid ID memory 24 in response to the ID by supplying the write address WADR, the write enable REN and the flag FLG of the value "1" to the valid ID memory 24. Then, the processing is ended.

(e) If on the other hand it is determined by the valid check circuit 23 that the flag is held at "1", then the valid check circuit 23 does not supply the reproduced data to the SDRAM packet controller 25 and the processing is ended.

When receiving the write request REQ, after the SDRAM write controller 26 has returned the acknowledge ACK to the valid check circuit 23, the SDRAM write controller 26 supplies various kinds of commands CMD such as address for writing data in the SDRAM 27 and bank address and the write request REQ to the SDRAM packet controller 25.

The SDRAM packet controller 25 writes the reproduced data DATA in the SDRAM 27 by supplying the reproduced data DATA from the valid check circuit 23 and commands A/BA/ . . . such as address and bank address to the SDRAM 27. The SDRAM packet controller 25 returns information START, which indicates the facet that the reproduced data starts being written in the SDRAM 27, and a packet valid VLD to the SDRAM write controller 26.

The SDRAM 27 has a storage capacity to store data of one segment shown in FIG. 7 and writes reproduced data of respective SYNC blocks at the recording positions corresponding to the IDs of the respective SYNC blocks. When the reproduced data of one segment is written in the SDRAM 27, a SDRAM read controller 28 supplies the command CMD for reading the reproduced data from the SDRAM 27 and the read request REQ to the SDRAM packet controller 25.

The SDRAM packet controller 25 reads the reproduced data from the SDRAM 27 by supplying commands A/BA/ . . . such as address and bank address to the SDRAM 27 in response to the read command CMD and the read request REQ. Then, the SDRAM controller 25 returns the information START, which indicates the fact that data starts being read out from the SDRAM 27, and the packet valid VLD to the SDRAM read controller 28.

The SDRAM packet controller 25 supplies the thus read reproduced data DATA to the SRAM 29. Also, the SDRAM read controller 28 writes the reproduced data in the SRAM 29 by supplying a write address WADR and a write enable WREN to the SRAM 29.

The SRAM read controller 30 reads out the reproduced data DATA from the SRAM 29 by supplying the read address RADR to the SRAM 29. Also, when the SRAM 29 becomes empty, the SRAM read controller 30 supplies information EMP/DADR indicating that the SRAM 39 became empty and an address (destination address) from which data is to be read out from the SDRAM 27 to the SDRAM read controller 28.

The SDRAM read controller 28 returns the acknowledge ACK to the SRAM read controller 30 in response to the information EMP/DADR and supplies the aforementioned command CMD and read request REQ to the SDRAM packet controller 25 with reference to this information EMP/DADR.

A timing generator 31 supplies a read start signal to the SRAM read controller 30 and also supplies timing information to the valid check circuit 23 and the SDRAM write controller 26.

The reproduced data DATA read out from the SDRAM 29 is outputted from the SRAM read controller 30 to the outside of the non-tracking processing circuit 15, which is supplied to the C2 error corrector 16 as shown in FIG. 5.

Referring back to FIG. 5, the reproduced data from the non-tracking processing circuit 15 is C2 error-corrected (error correction using outer parity) by the C2 error corrector 16 and video data of the output data from the C2 error corrector 16 is expanded by the video expander 17, thereby resulting in a reproduced video signal and a reproduced audio signal being obtained.

Next, let us describe the manner in which the inerasable previously-recorded track may be excluded from those to be C2 error-corrected upon editing in this VTR.

FIG. 10A shows the state in which the recording head 5 (FIG. 5) is off-tracked so as to be advanced from the previously-recorded track in the video tape transport direction upon insert editing for editing data of one segment shown in FIG. 7. At that time, since an edit portion (portion in which data is recorded actually upon editing) is advanced from the segment to be edited, the previously-recorded track recorded on the rear end portion of the segment to be edited is left inerasable adjacent to the exit of edit-point (rear end of the edit portion). This inerasable previously-recorded track is located in the pre-writing priority area within the segment as shown in FIG. 7.

When the video tape is reproduced in this state by the VTR, the reproducing head 6 (FIG. 5) reproduces the edit portion first, whereafter it reproduces the inerasable previously-recorded track.

Figure 11A:
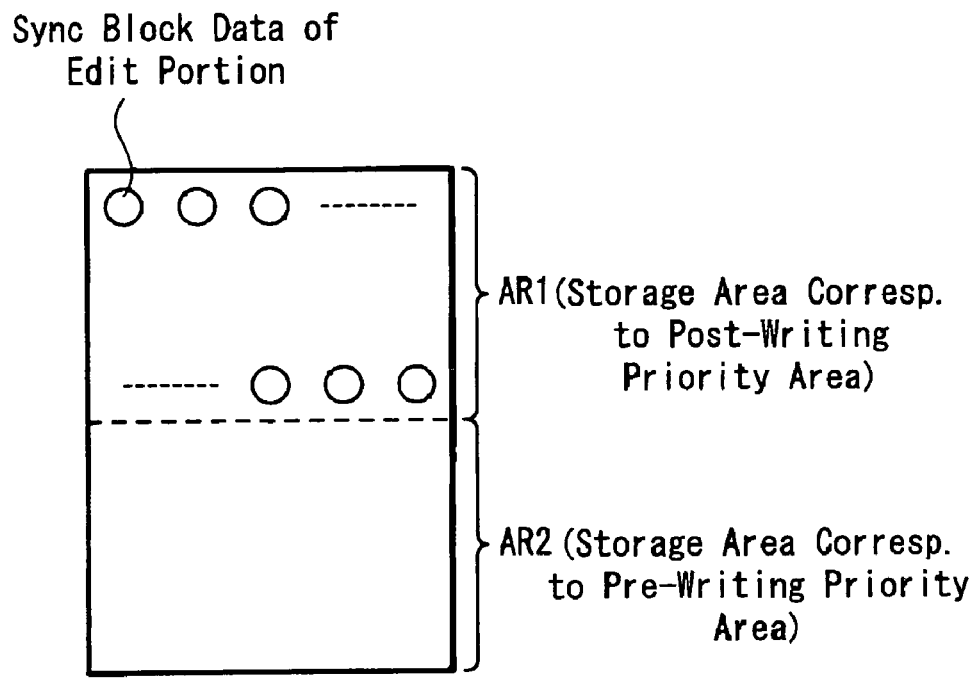
FIGS. 11A and 11B are schematic diagrams showing data (in the case of FIG. 10A) written in a storage area of a SDRAM shown in FIG. 8, respectively.

When reproduced data of the respective SYNC blocks reproduced from the first half of the segment (post-writing priority area as shown in FIG. 7) of the edit portion of one segment and which were C1 error-corrected by the C1 error correctors 11 to 14 are supplied to the non-tracking processing circuit 15, the valid check circuit 23 effects the aforementioned processing (a) and (b) on the reproduced data so that the reproduced data are written in the recording area AR1 corresponding to the first half (post-writing priority area) of the segment of the storage area of one segment of the SDRAM 27 as shown in FIG. 11A.

Figure 11B:
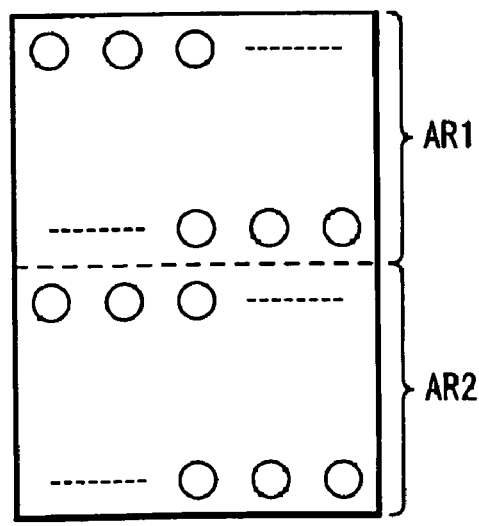

Subsequently, when reproduced data of the respective SYNC blocks reproduced from the second half (pre-writing priority area shown in FIG. 7) of the segment of this edit portion and which were C1 error-corrected by the C1 error correctors 11 to 14 are supplied to the non-tracking processing circuit 15, the valid check circuit 23 effects the aforementioned processing (a), (b) and (d) on the reproduced data so that the reproduced data are written in the area AR2 corresponding to the second half (pre-writing priority area) of the segment of the storage area of one segment of the SDRAM 27 as shown in FIG. 11B.

Also, at that time, according to the processing (d), a flag "1" indicating that the reproduced data of the SYNC blocks of the IDs were already written in the SDRAM 27 in response to the IDs of all SYNC blocks within the pre-writing priority area is stored in the valid ID memory 24.

Thereafter, when the reproduced data of the respective SYNC blocks reproduced from the inerasable previously-recorded track and which were C1 error-corrected by the C1 error correctors 11 to 14 are supplied to the non-tracking processing circuit 15, the valid check circuit 23 effects the aforementioned processing (a), (c) and (e) on the above reproduced data so that the reproduced data are not supplied to the SDRAM 27.

As described above, even when the inerasable previously-recorded track exists in the rear end side of the edit portion, the data reproduced from the inerasable previously-recorded track and which were C1 error-corrected by the C1 error correctors 11 to 14 are not written in the SDRAM 27. Accordingly, the data reproduced from the inerasable previously-recorded track and which were C1 error-corrected by the C1 error correctors 11 to 14 can be inhibited from being supplied to the C2 error corrector 16.

FIG. 10B shows the state in which the recording head 5 is off-tracked from the previously-recorded track so as to be delayed on the video tape transport direction upon insert editing for editing data of one segment shown in FIG. 7. At that time, since the edit portion is delayed from the segment to be edited, the previously-recorded track recorded on the front end portion of the segment to be edited is left inerasable adjacent to the entrance of edit-point (front end of edit portion). The inerasable previously-recorded track is located at the post-writing priority area within the segment as shown in FIG. 7.

When the video tape is reproduced in this state by the VTR, the reproducing head 6 reproduces first the inerasable previously-recorded track and then it reproduces the edit portion.

Figure 12A:
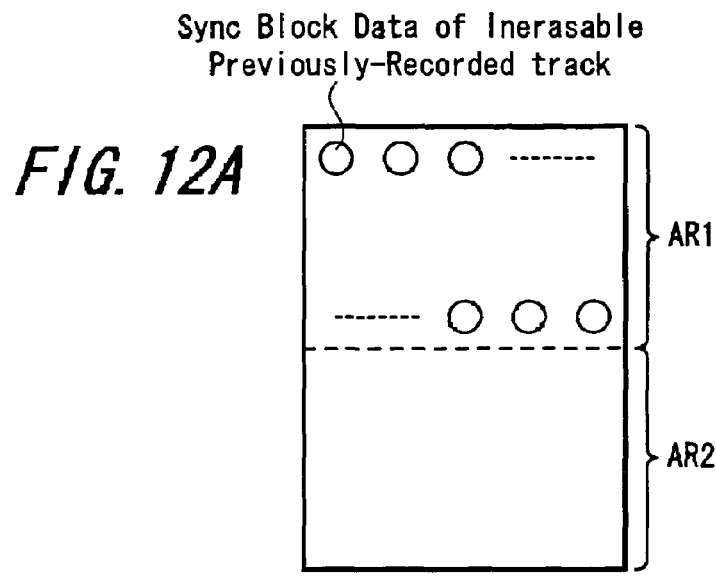
FIGS. 12A to 12C are schematic diagrams showing data (in the case of FIG. 10B) written in the storage area of the SDRAM shown in FIG. 8, respectively.

When the reproduced data of the respective SYNC blocks reproduced from the inerasable previously-recorded track and which were C1 error-corrected by the C1 error correctors 11 to 14 are supplied to the non-tracking processing circuit 15, the valid check circuit 23 effects the aforementioned processing (a) and (b) on the above-mentioned reproduced data so that the reproduced data are written in the SDRAM 27 at its recording position corresponding to the ID of the SYNC block of the recording area AR1 corresponding to the first half (post-writing priority area) of the segment as shown in FIG. 12A.

Figure 12B:
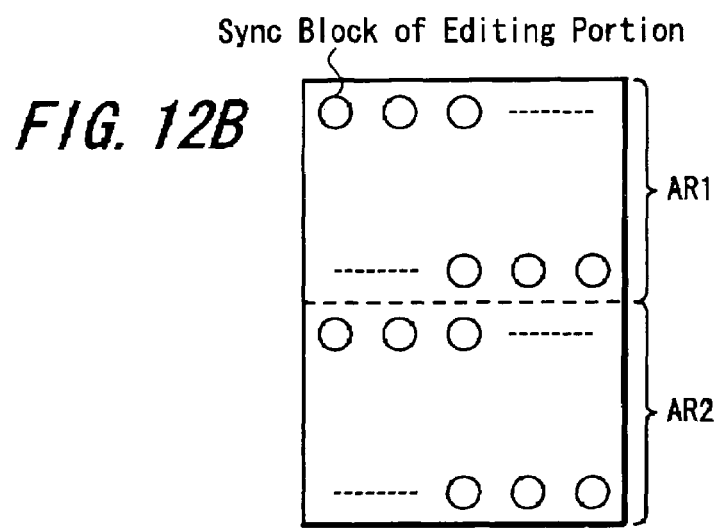

However, after that, when the reproduced data of the respective SYNC blocks reproduced from the first half (post-writing priority area) of the segment of the edit portion of one segment and which were C1 error-corrected by the C1 error correctors 11 to 14 are supplied to the non-tracking processing circuit 15, the valid check circuit 23 effects the aforementioned processing (a) and (b) on the above-mentioned reproduced data so that the reproduced data of the SYNC block of the same ID from the post-writing priority area is overwritten in the recording area AR1 at the recording position in which the reproduced data from the inerasable previously-recorded track is written as shown in FIG. 12B.

Figure 12C:
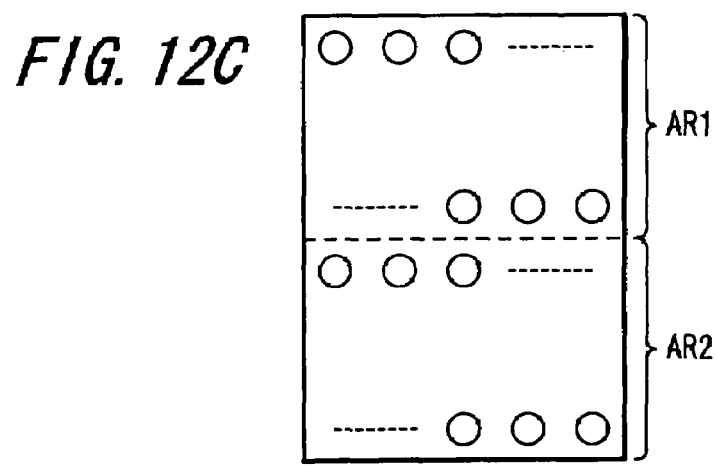

Subsequently, when the reproduced data of the respective SYNC blocks reproduced from the second half (pre-writing priority area) of the segment of this edit portion and which were C1 error-corrected by the C1 error correctors 11 to 14 are supplied to the non-tracking processing circuit 15, the valid check circuit 23 effects the aforementioned processing (a), (c) and (d) on the above-mentioned reproduced data so that the reproduced data is written in the SDRAM 27 at its recording area AR2 corresponding to the second half (pre-writing priority area) of the segment as shown in FIG. 12C.

As described above, when the inerasable previously-recorded track exits in the front end side of the edit portion, although the data C1 error-corrected by the C1 error correctors 11 to 14 after they have been reproduced from the inerasable previously-recorded track are temporarily written in the SDRAM 27, such data can be erased by overwriting the reproduced data from the edit portion. Accordingly, the data reproduced from the inerasable previously-recorded track and which were C1 error-corrected by the C1 error correctors 11 to 14 can be inhibited from being supplied to the C2 error corrector 16.

In this manner, in this VTR, since data of the first half and the second half of the segment, that is the editing unit, are respectively discriminated into the post-writing priority area and the pre-writing priority area and written in the SDRAM 27 within the non-tracking processing circuit 15, even when the inerasable previously-recorded track exists in any one of the entrance of the edit-point and the exit of the edit-point, the inerasable previously-recorded track can be excluded from those to be C2 error-corrected by the C2 error corrector 16.

Figure 3:
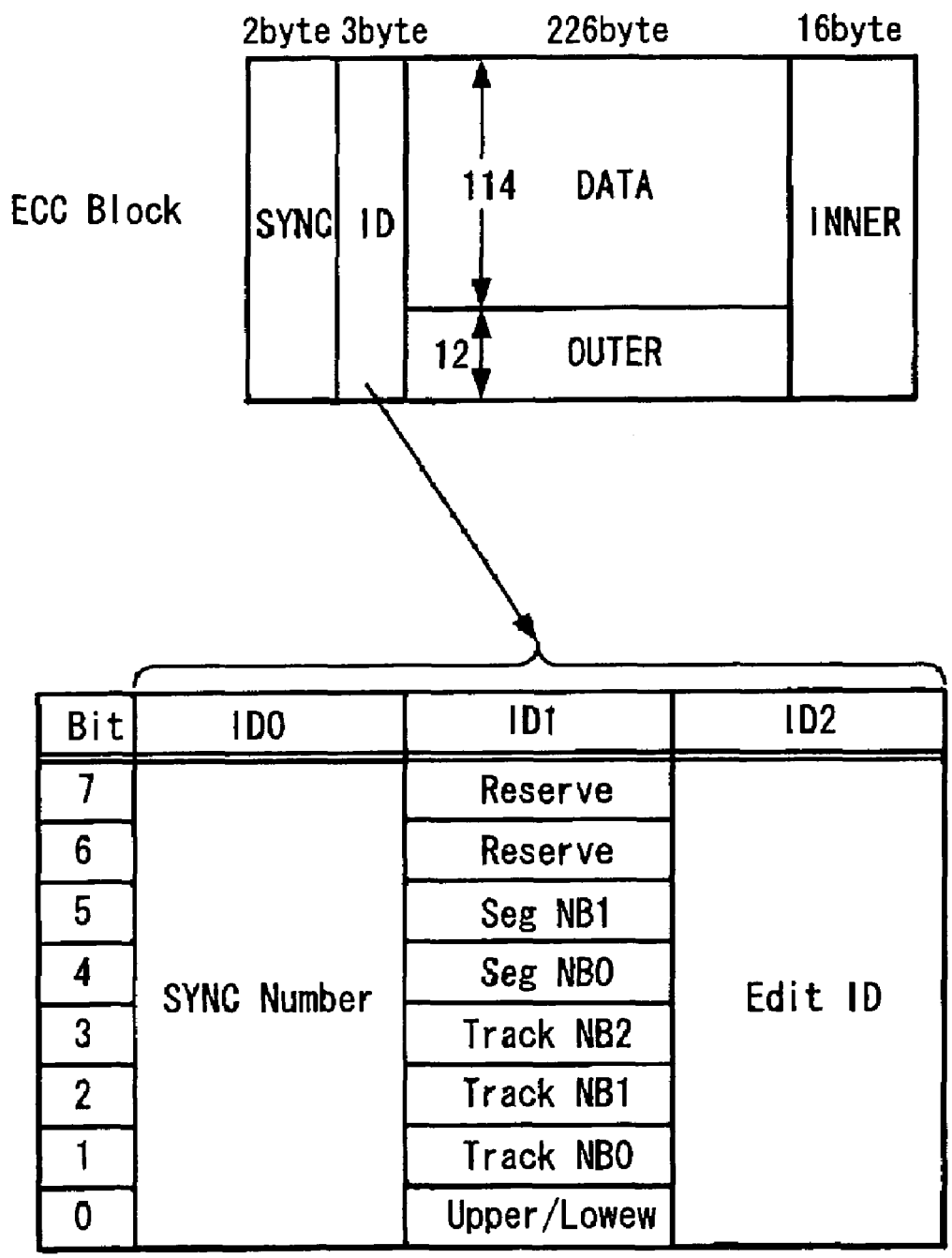
FIG. 3 is a schematic diagram showing an example of Edit ID inserted into the ID of the SYNC block upon non-tracking reproduction according to the related art.

Also, as is clear from the comparison with the example of the related art shown in FIG. 3, since the Edit ID is not inserted into the ID of the SYNC block, the recording densities of the video and audio signals can be substantially prevented from being lowered.

Figure 4:
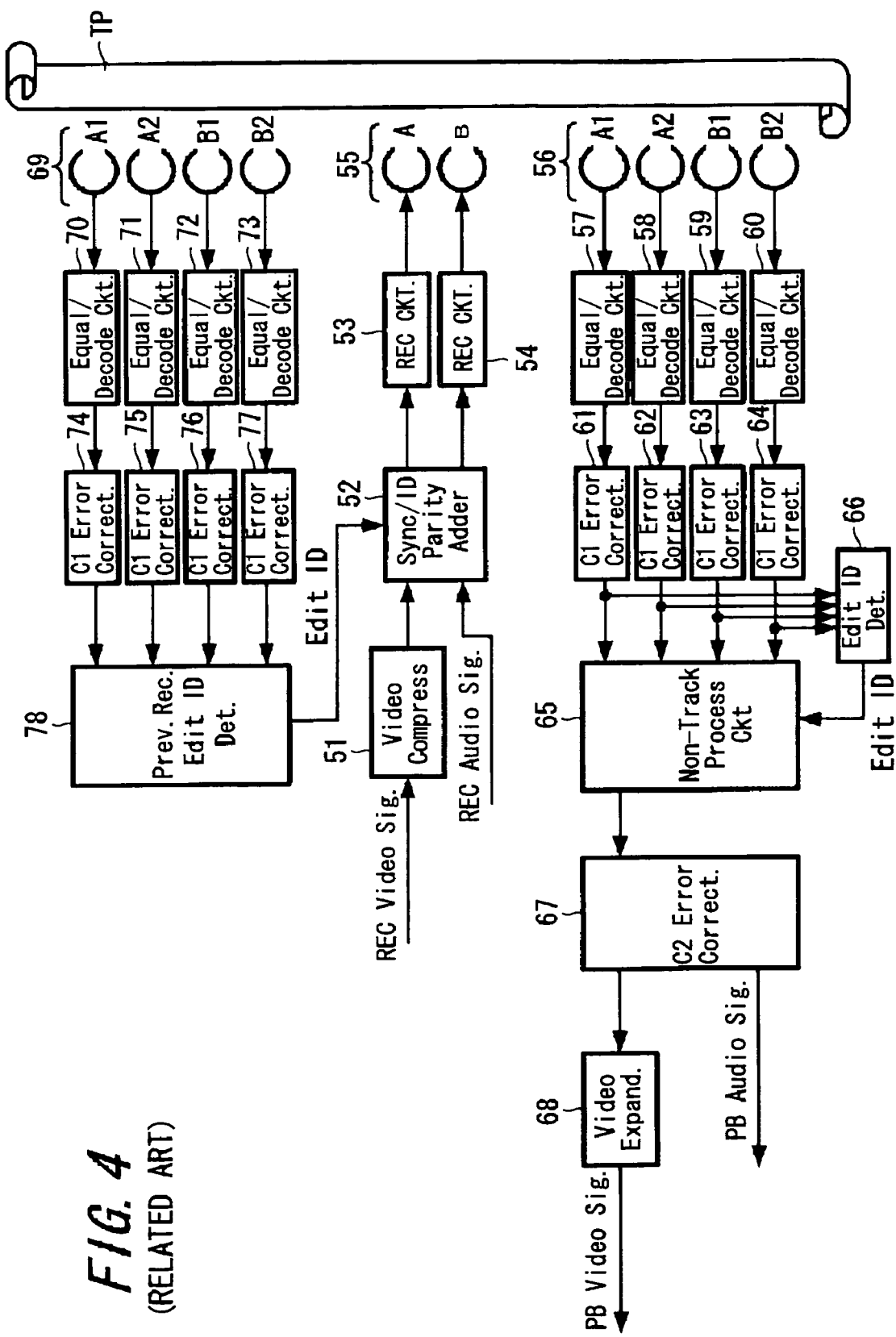
FIG. 4 is a block diagram showing an example of an arrangement of a recording and reproducing system of a non-tracking reproduction system VTR according to the related art.

Further, as is clear from the comparison with the example of the related art shown in FIG. 4, since this VTR is not provided with the reproducing system (reproducing head and signal processing circuit) for detecting the Edit ID of the inerasable previously-recorded track, it becomes easy to miniaturize the rotary drum and to simplify the circuit arrangement of the VTR.

Figure 13:
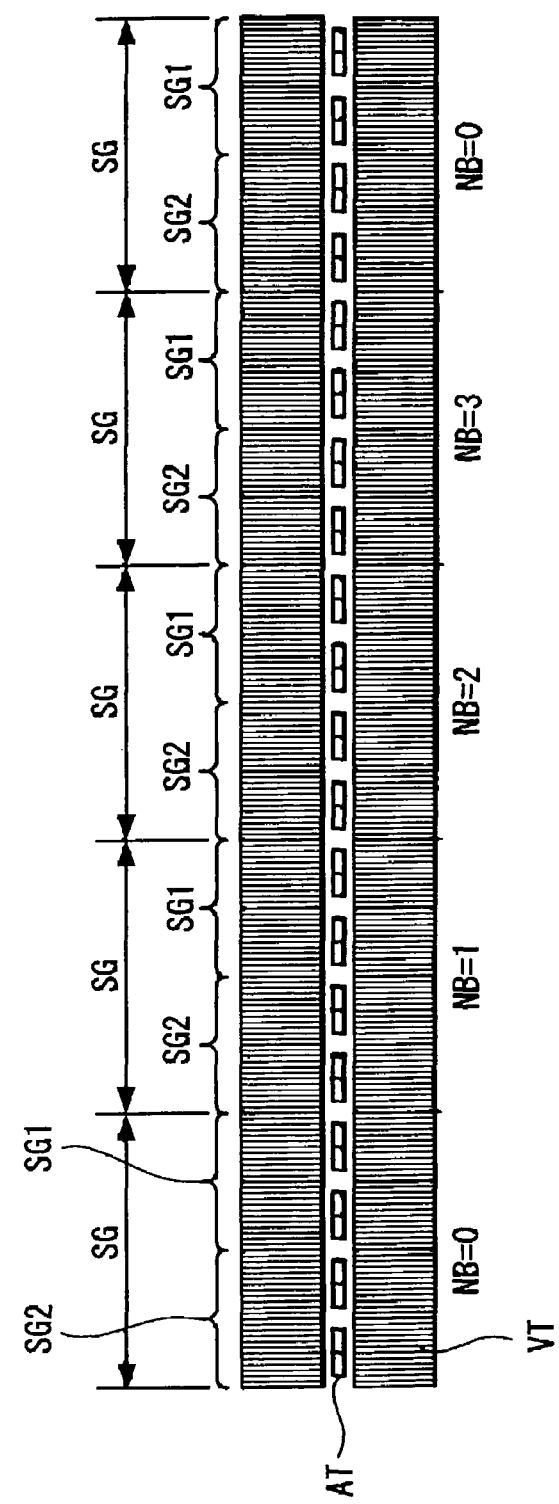
FIG. 13 is a schematic diagram showing a pre-writing priority area and a post-writing priority area required upon reverse reproduction.

The reason that the data of the first half and the second half of the segment are respectively set to the post-writing priority area and the pre-writing priority area as described in the above-mentioned embodiment, this setting is suitable for the forward reproduction in which the video tape is transported in the forward direction to reproduce video and audio signals. On the other hand, in the case of the reverse reproduction in which the video tape is transported in the opposite direction to reproduce video and audio signals, conversely, as shown in FIG. 13, data of the first half and the second half of the segment SG may be respectively set to the pre-writing priority area SG2 and the post-writing priority area SG1 and then the valid check circuit 23 within the non-tracking processing circuit 15 may execute the aforementioned processing (a) to (e).

However, when the reproducing heads with the same azimuth angle in which angular extents among the reproducing heads are not equal on the rotary drum are used as the reproducing heads 6, a new problem arises in the reverse reproduction. This new problem and a method for solving this problem will be described below.

When the angular extents of the reproducing heads with the same azimuth angle are equal on the rotary drum, if the heights of the reproducing heads are selected to be the same on the rotary drum, the reproducing heads are able to scan the tracks at constant interval. However, when the angular extents of the reproducing heads with the same azimuth angle are not equal on the rotary drum, unless the heights of the reproducing heads are shifted on the rotary drum, then the reproducing heads are unable to scan the tracks at constant interval.

Figure 14A:
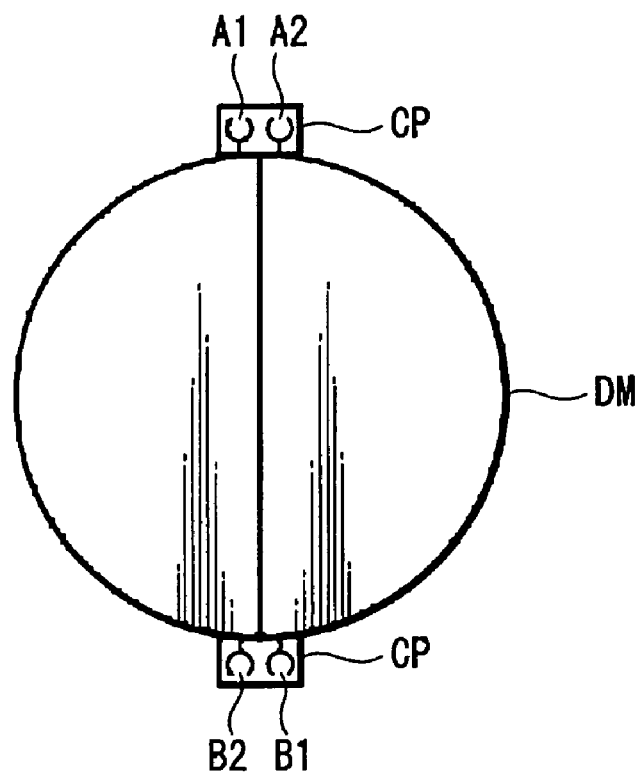
FIGS. 14A and 14B are schematic diagrams showing examples of one-chip two-gap type reproducing heads, respectively.
Figure 14B:
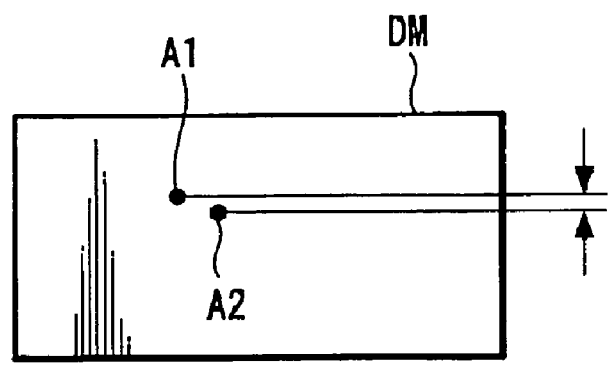

FIG. 14A shows the case (example of one-chip two-gap head) in which reproducing heads A1 and A2 and reproducing heads B1 and B2 are formed on chips CP by evaporating thin films, these reproducing heads A1, A2, B1, B2 being mounted on a rotary drum DM, as the example in which the angular extents of the reproducing heads are not equal on the rotary drum. In the case of the one-chip two-gap head, as FIG. 14B shows the reproducing heads A1 and A2, the two reproducing heads on the same chip are mounted in such a manner that one reproducing heads A1, B1 are mounted on the rotary drum DM at the position higher than the position at which the remaining reproducing heads A2, B2 are mounted on the rotary drum DM (for example, the position at which the heights of the reproducing heads A, B1 are shifted one track pitch).

If the heights of the reproducing heads with the same azimuth angle are made different on the rotary drum as described above, then in the case of the reverse reproduction, the reproduction order in which the SYNC block of the same ID is reproduced with priority from the inerasable previously-recorded track or the edit portion is changed with the tracking phases of the reproducing heads.

FIGS. 15A to 15D are schematic diagrams showing the reproduction order in which the inerasable previously-recorded track and the edit portion are reproduced by the reproducing head A1 mounted on the rotary drum at the high position and the reproducing head A2 mounted on the rotary drum at the low position. FIGS. 15A and 15B show the case in which the inerasable previously-recorded track exists at the entrance of edit-point, and the tracking phases are different in FIGS. 15A and 15B. FIGS. 15C and 15D show the case in which the inerasable previously-recorded track exists at the exit of edit-point, and the tracking phase are different in FIGS. 15C and 15D. In each of FIGS. 15A to 15D, hatched portions in the previously-recorded track and the edit portion indicate portions in which the SYNC block of the same ID is recorded.

In the case of FIG. 15A, of the recording portions of the SYNC blocks of the same ID in the inerasable previously-recorded track and the edit portion (hatched portions), first, the reproducing head A2 scans the inerasable previously-recorded track (dashed-line arrow in the left-hand side of FIG. 15A) and then the reproducing head A1 scans the edit portion (dashed-line arrow in the right-hand side of FIG. 15A).

In the case of FIG. 15B, of the recording portions of the SYNC blocks of the same ID, first, the reproducing head A1 scans the inerasable previously-recorded track (shown by a dashed-line arrow in the left-hand side of FIG. 15B) and then the reproducing head A2 scans the edit portion (shown by a dashed-line arrow in the right-hand side of FIG. 15B).

In the case of FIG. 15C, of the recording portions of the SYNC blocks of the same ID, first, the reproducing head A2 scans the edit portion (shown by a dashed-line arrow in the left-hand side of FIG. 15C) and then the reproducing head A1 scans the inerasable previously-recorded track (shown by a dashed-line arrow in the right-hand side of FIG. 15C).

In the case of FIG. 15D, of the recording portions of the SYNC blocks of the same ID, first, the reproducing head A1 scans the edit portion (shown by a dashed-line arrow in the left-hand side of FIG. 15D) and then the reproducing head A2 scans the inerasable previously-recorded track (shown by a dashed-line arrow in the right-hand side of FIG. 15D).

As described above, in the case of the forward reproduction, at the entrance of edit-point, of the recording portions of the SYNC blocks of the same ID of the inerasable previously-recorded track and the edit portion, the inerasable previously-recorded track is constantly reproduced prior to the edit portion regardless of the tracking phase. Also, at the exit of edit-point, regardless of the tracking phase, of the recording portions of the SYNC blocks of the same ID in the inerasable previously-recorded track and the edit portion, the inerasable previously-recorded track is constantly reproduced after the edit portion.

Accordingly, the output data from the C1 error correctors 11 to 14 are supplied to the non-tracking processing circuit as they are, whereby the inerasable previously-recorded track can constantly be excluded from those to be C2 error-corrected by the C2 error corrector 16 as has already been described.

On the other hand, FIGS. 16A to 16D are schematic diagrams showing the reproduction order in which the inerasable previously-recorded track and the edit portion are reproduced by the reproducing head A1 mounted on the rotary drum at the high position and the reproducing head A2 on the rotary drum at the low position in the reverse reproduction similarly to FIGS. 15A to 15D. FIGS. 16A and 16B show the case in which the inerasable previously-recorded track exists at the entrance of edit-point, and the tracking phases are different in FIGS. 16A and 16B. FIGS. 16C and 16D show the case in which the inerasable previously-recorded track exists at the exit of edit-point, and the tracking phases are different in FIGS. 16C and 16D. In FIGS. 16A to 16D, hatched portions in the inerasable previously-recorded tracks and the edit portions indicate portions in which the data of the SYNC blocks of the same ID are recorded.

In the case of FIG. 16A, of the recorded portions (hatched portions) of the SYNC block of the same ID in the inerasable previously-recorded track and the edit portion, first, the reproducing head A1 scans the edit portion (shown by a dashed-line arrow in the right-hand side of FIG. 16A) and then the reproducing head A2 scans the inerasable previously-recorded track (shown by a dashed-line arrow in the left-hand side of FIG. 16A).

In the case of FIG. 16B, of the recorded portion of the SYNC block of the same ID, first, the reproducing head A1 scans the inerasable previously-recorded track (shown by a dashed-line arrow in the left-hand side of FIG. 16B) and then the reproducing head A2 scans the edit portion (shown by a dashed-line arrow in the right-hand side of FIG. 16B).

In the case of FIG. 16C, of the recorded portion of the SYNC block of the same ID, first, the reproducing head A1 scans the inerasable previously-recorded track (shown by a dashed-line arrow in the right-hand side of FIG. 16C) and then the reproducing head A2 scans the edit portion (shown by a dashed-line arrow in the left-hand side of FIG. 16C).

In the case of FIG. 16D, of the recorded portion of the SYNC block of the same ID, first, the reproducing head A1 scans the edit portion (shown by a dashed-line arrow in the left-hand side of FIG. 16D) and then the reproducing head A2 scans the inerasable previously-recorded track (shown by a dashed-line arrow in the right-hand side of FIG. 16D).

As described above, in the case of the reverse reproduction, the reproduction order in which the recorded portion of the SYNC block of the same ID is reproduced with priority from the inerasable previously-recorded track or the edit portion is changed at both of the entrance of edit-point and the exit of edit-point depending upon the tracking phase.

Then, in the case of the tracking phases shown in FIGS. 16A and 16C, since the reproduction order becomes opposite to that of the forward reproduction, only if the pre-writing priority area and the post-writing priority area of the segment are set as shown in FIG. 13, the non-tracking processing circuit 15 can exclude the inerasable previously-recorded track from those to be C2 error-corrected by the C2 error corrector 16.

On the other hand, in the case of the tracking phase shown in FIGS. 16B and 16D, since the reproduction order becomes the same as that of the forward reproduction, only if the pre-wiring priority area and the post-writing priority area of the segment are set as shown in FIG. 13, the non-tracking processing circuit 15 cannot exclude the inerasable previously-recorded track from those to be C2 error-corrected by the C2 error corrector 16.

In the case of FIG. 16B, the reproducing head which first scans the inerasable previously-recorded track prior to the edit portion is the reproducing head A1 mounted on the rotary drum at the high position. Also in the case of FIG. 16D, the reproducing head which first scans the edit portion prior to the inerasable previously-recorded track is the reproducing head A1 on the rotary drum at the high position.

Accordingly, if the reproduced signal reproduced by the reproducing head A1 is delayed from the reproduced signal reproduced by the reproducing head A2 before it is inputted to the non-tracking processing circuit 15, then in the case of the tracking phase shown in FIGS. 16B and 16D, the reproduction order can be made opposite to that of the forward reproduction as seen from the side of the non-tracking processing circuit 15.

Figure 17:
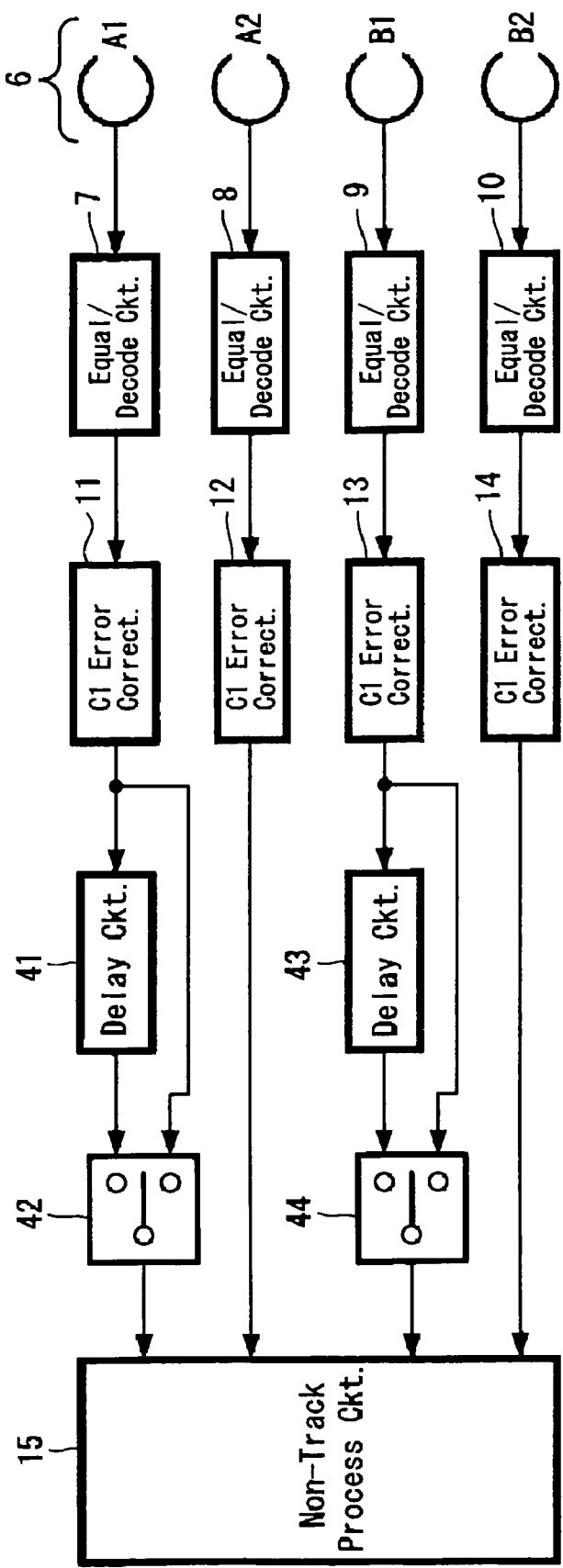
FIG. 17 is a schematic block diagram showing an example of a partial modification of the arrangement of the recording and reproducing system shown in FIG. 5.

Accordingly, when the reproducing heads A1, B1 are higher on the rotary drum than the reproducing heads A2, B2, in addition to the arrangement in which the pre-writing priority area and the post-writing priority area of the segment are set as shown in FIG. 13, as shown in FIG. 17, a delay circuit 41 and a two-input and one-output change-over switch 42 are provided between the C1 error corrector 11 corresponding to the reproducing head A1 of the C1 error correctors 11 to 14 and the non-tracking processing circuit 15, and an output from the change-over switch 42 is supplied to the non-tracking processing circuit 15.

A delay time of this delay circuit 41 is set to be slightly larger than a time difference obtained during which the reproducing head A2 reproduces data at a certain position on the track scanning direction after the reproducing head A1 has scanned data at a certain position on the track scanning direction.

Further, as shown in FIG. 17, a delay circuit 43 and a change-over switch 44 are provided between a C1 error corrector 13 corresponding to the reproducing head B1 and the non-tracking processing circuit 15 in exactly the same manner.

Then, in the case of the forward reproduction, under control of a microprocessor (not shown), inputs of the change-over switches 42, 44 are respectively switched to the side of the C1 error correctors 11, 13, whereby output data of the C1 error correctors 11, 13 are supplied to the non-tracking processing circuit 15 as they are similarly to the case of the example shown in FIG. 5.

On the other hand, in the case of the reverse reproduction, the inputs of the change-over switches 42, 44 are respectively switched to the sides of the delay circuits 41, 43, whereby the outputs from the C1 error correctors 11, 13 are respectively delayed by the delay circuits 41, 43 and supplied to the non-tracking processing circuit 15.

Thus, also in the case of the tracking phase shown in FIG. 16B, of the recorded portion of the SYNC block of the same ID in the edit portion, the scanned result obtained when the edit portion is scanned by the reproducing head A2 is supplied to the non-tracking processing circuit 15 prior to the scanned result obtained when the inerasable previously-recorded track is scanned by the reproducing head A1.

Further, also in the case of the tracking phase shown in FIG. 16D, of the recorded portion of the SYNC block of the same. ID of the inerasable previously-recorded track and the edit portion, the scanned result obtained when the inerasable previously-recorded track is scanned by the reproducing head A2 is supplied to the non-tracking processing circuit 15 prior to the scanned result obtained when the edit portion is scanned by the reproducing head A1.

Figure 18A:
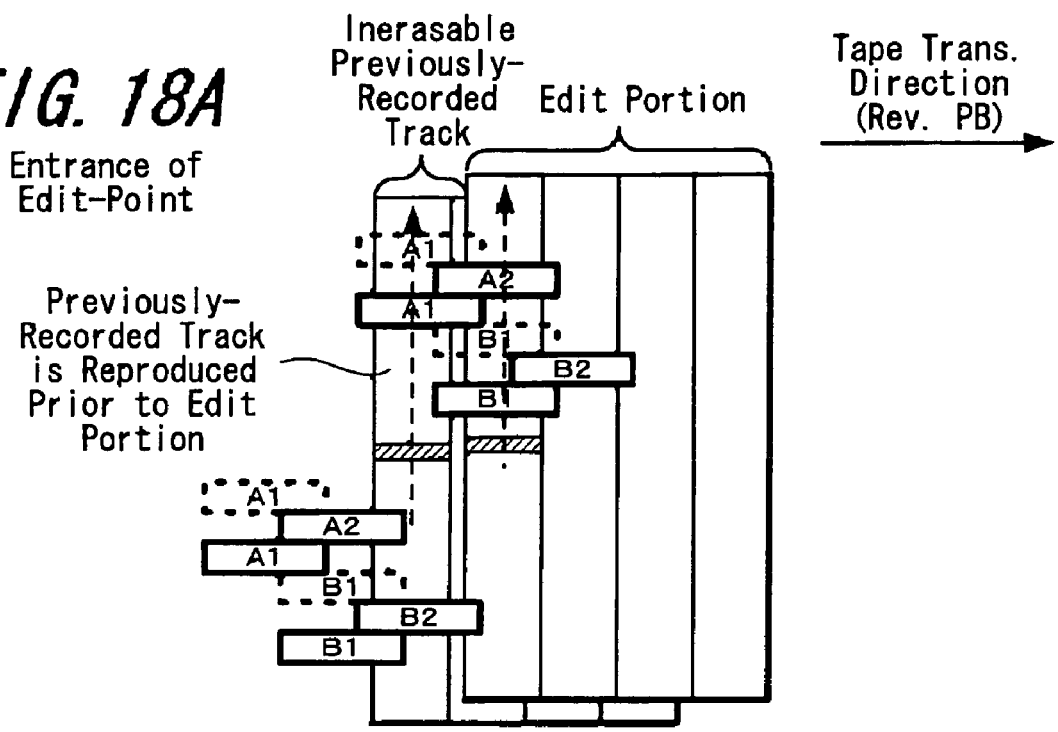
FIGS. 18A and 18B are respectively schematic diagrams showing the changes of the orders in which the inerasable previously-recorded track and the edit portion are reproduced by the reproducing head, as seen from the side of the non-tracking processing circuit, in the modified example shown in FIG. 17.
Figure 18B:
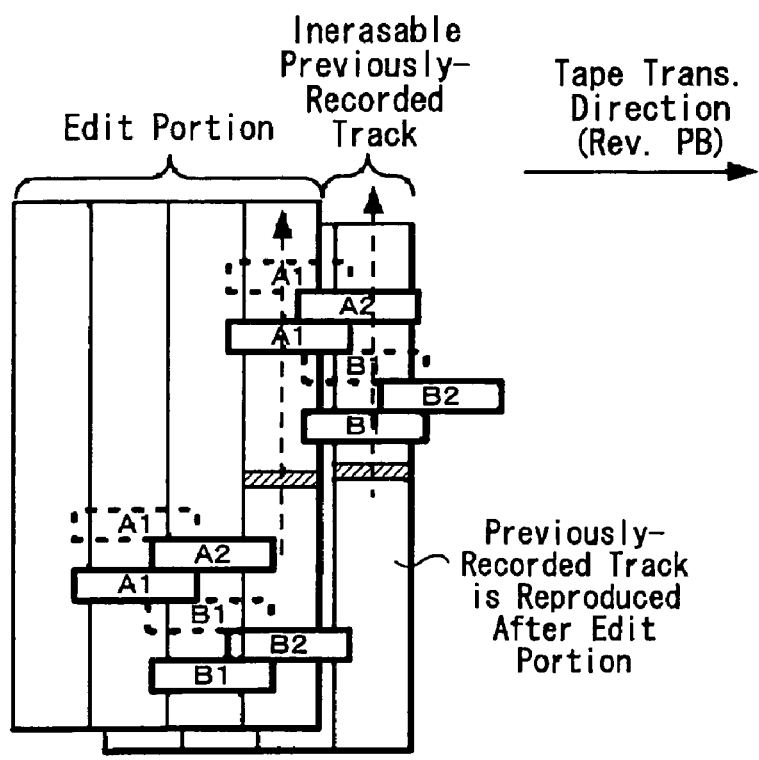

In other words, as seen from the side of the non-tracking processing circuit 15, the reproduction order shown in FIG. 16B is changed into the reproduction order in which the reproducing head A2 scans the edit portion first and then the reproducing head A1 scans the inerasable previously-recorded track as shown in FIG. 18A. Also, the reproduction order shown in FIG. 16D is changed into the reproduction order in which the reproducing head A2 scans the inerasable previously-recorded track first and then the reproducing head A1 scans the edit portion as shown in FIG. 18B. In FIGS. 18A and 18B, the actual positions of the reproducing heads A1, B1 are shown by the dashed lines and the positions of the reproducing heads A, B1 are shown by the solid lines as seen from the side of the non-tracking processing circuit 15.

In the case of the reverse reproduction, since the delay circuits 41, 43 are provided as described above, regardless of the tracking phase, at the entrance of edit-point, of the recorded portion of the SYNC block of the same ID in the inerasable previously-recorded track and the edit portion, the inerasable previously-recorded track can constantly be reproduced after the edit portion. Also, at the exit of edit-point, of the recorded portion of the SYNC block of the same ID in the inerasable previously-recorded track and the edit portion, the inerasable previously-recorded track can constantly be reproduced prior to the edit portion.

As a consequence, since the reproduction order becomes completely opposite to that of the forward reproduction, also in the case of the reverse reproduction, it becomes possible to constantly exclude the inerasable previously-recorded track from those to be C2 error-corrected by the C2 error corrector 16.

In the above-mentioned example, of the 48 video tracks comprising the segment serving as the editing unit, the half (the second half in the case of the forward reproduction or the first half in the case of the reverse reproduction) of the 48 video tracks, that is, 24 video tracks are set to the pre-writing priority area. However, if the number of the video tracks which have a possibility in which the previously-recorded tracks will be left inerasable is N which is a positive integer smaller than 24, then N video tracks may be set to the pre-writing priority area. When the pre-writing priority area is set to the necessary and minimum video tracks as described above, the storage capacity of the valid ID memory 24 within the non-tracking processing circuit 15 can be saved.

While the 48 video tracks comprise one segment and there is provided a pair of two reproducing heads with positive azimuth angles and negative azimuth angles in the above-mentioned example, the present invention is not limited thereto and it is needless to say that the video tracks of the number other than 48 video tracks may comprise one segment and that more than three (2's multiple in the case of one-chip two-gap reproducing head) reproducing heads with positive azimuth angles and negative azimuth angles may be provided.

While the inerasable previously-recorded track is excluded from those to be C2 error-corrected by the C2 error corrector 16 upon insert editing in the above-mentioned example, the present invention is not limited thereto and the inerasable previously-recorded track can be excluded from those to be C2 error-corrected by the C2 error corrector 16 upon splice editing in exactly the same manner as that of the case in which the inerasable previously-recorded track is excluded from those to be C2 error-corrected by the C2 error corrector 16 upon insert editing at the entrance of edit-point.

While the present invention is applied to the VTR in the above-mentioned example, the present invention is not limited thereto and the present invention can be applied to all sorts of reproducing apparatus for reproducing tracks recorded on a tape-like recording medium in a non-tracking reproduction fashion.

According to the present invention, in the VTR or other reproducing apparatus for reproducing the tracks recorded on the tape-like recording medium in a non-tracking reproduction fashion, since the front side and the rear side of the editing unit are discriminated into the post-writing priority area and the pre-writing priority area and written in the memory, even when the inerasable previously-recorded track exists in any one of the front end side and the rear end side of the edit portion, the inerasable previously-recorded track can be excluded from those to be C2 error-corrected by the C2 error corrector.

As a result, unlike the related art in which the Edit ID is inserted into the ID of the SYNC block and in which the reproducing apparatus includes the reproducing system for detecting the Edit ID of the inerasable previously-recorded track, there can be achieved the effect in which the inerasable previously-recorded track can be excluded from those to be C2 error-corrected by the C2 error corrector upon editing.

Further, if the pre-writing priority area and the post-writing priority area in the editing unit are set in the opposite manner, in the reverse reproduction, there can be achieved the effect in which the inerasable previously-recorded track can be excluded from those to be C2 error-corrected by the C2 error corrector.

Furthermore, if the reproduced signal from the reproducing head mounted on the rotary drum at the high position is delayed from the reproduced signal from the reproducing head mounted on the rotary drum at the low position in addition to the arrangement in which the pre-writing priority area and the post-writing priority area are set in the opposite manner, even when a plurality of reproducing heads with the same azimuth angle is provided on the rotary drum with unequal angular extents, there can be achieved the effect in which the inerasable previously-recorded track can constantly be excluded from those to be C2 error-corrected by the C2 error corrector upon reverse reproduction.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claim.

What is claimed is:

1. A non-tracking reproduction system data reproducing apparatus in which a plurality of reproducing heads scans the same track on a tape-like recording medium or a single reproducing head scans the same track on said tape-like recording medium a plurality of times, reproduced data obtained by respective scanning is error-corrected at every predetermined recording block by using inner parity, reproduced data error-corrected by said error correction is written in a memory and reproduced data read out from said memory is error-corrected by using outer parity, comprising:

identifying means for setting tracks of the number of a part of the rear side of tracks of the predetermined number serving as the minimum editing unit to a pre-writing priority area and remaining tracks to a post-writing priority area, respectively, and determining whether or not reproduced data of a recording block having the same identification data as that of a recording block has already been written in said memory with respect to each said recording block reproduced from said pre-writing priority area and which is error-corrected by using said inner parity; and control means for allowing reproduced data of the recording block of which reproduced data was not yet written in said memory as determined by said identifying means to be written in said memory and inhibiting reproduced data of the recording block of which reproduced data was already written in said memory as determined by said identifying means from being written in said memory.

2. A data reproducing apparatus according to claim 1, wherein said identifying means sets tracks of a part of the front side of said tracks of the predetermined number serving as said minimum editing unit to a pre-writing priority area when said tape-like recording medium is transported in the opposite direction and reproduced and said identifying means sets the remaining tracks to a post-writing priority area.

3. A data reproducing apparatus according to claim 2, further comprising delay means for delaying a reproduced signal reproduced from a reproducing head, of a plurality of reproducing heads, mounted on a rotary drum at the high position from a reproduced signal reproduced from a reproducing head mounted on said rotary drum at the low position when said plurality of reproducing heads with the same azimuth angle is mounted on said rotary drum with unequal angular extents and said tape-like recording medium is transported in the opposite direction and reproduced.

4. A data reproducing method in which a plurality of reproducing heads scans the same track on a tape-like recording medium or a single reproducing head scans the same track on said tape-like recording medium a plurality of times, reproduced data obtained by respective scanning is error-corrected at every predetermined recording block by using inner parity, reproduced data error-corrected by said error correction is written in a memory and reproduced data read out from said memory is error-corrected by using outer parity, comprising:

a first step for setting tracks of the number of a part of the rear side of tracks of the predetermined number serving as the minimum editing unit to a pre-writing priority area and remaining tracks to a post-writing priority area, respectively, and determining whether or not reproduced data of a recording block having the same identification data as that of a recording block has already been written in said memory with respect to each said recording block reproduced from said pre-writing priority area and which is error-corrected by using said inner parity; and a second step for allowing reproduced data of the recording block of which reproduced data was not yet written in said memory as determined at said first step to be written in said memory and inhibiting reproduced data of the recording block of which reproduced data was already written in said memory as determined at said first step from being written in said memory means.

5. A data reproducing method according to claim 4, wherein said first step sets tracks of a part of the front side of said tracks of the predetermined number serving as said minimum editing unit to a pre-writing priority area when said tape-like recording medium is transported in the opposite direction and reproduced and said identifying means sets the remaining tracks to a post-writing priority area.

6. A data reproducing method according to claim 5, further comprising a step for delaying a reproduced signal reproduced from a reproducing head, of a plurality of reproducing heads, mounted on a rotary drum at the high position from a reproduced signal reproduced from a reproducing head mounted on said rotary drum at the low position when said plurality of reproducing heads with the same azimuth angle is mounted on said rotary drum with unequal angular extents and said tape-like recording medium is transported in the opposite direction and reproduced.

* * * * *